(12) United States Patent
Boaz

(10) Patent No.: US 7,400,264 B2
(45) Date of Patent: Jul. 15, 2008

(54) AUTOMATED METER READING SYSTEM, COMMUNICATION AND CONTROL NETWORK FOR AUTOMATED METER READING, METER DATA COLLECTOR, AND ASSOCIATED METHODS

(75) Inventor: Jon A. Boaz, Colleyville, TX (US)

(73) Assignee: Energy Technology Group, Inc., Fort Worth, TX (US)

( * ) Notice: Subject to any disclaimer, the term of this patent is extended or adjusted under 35 U.S.C. 154(b) by 451 days.

(21) Appl. No.: 10/779,429

(22) Filed: Feb. 13, 2004

(65) Prior Publication Data

US 2007/0001868 A1    Jan. 4, 2007

Related U.S. Application Data

(60) Provisional application No. 60/447,815, filed on Feb. 14, 2003.

(51) Int. Cl.
    *G08C 15/06*    (2006.01)
(52) U.S. Cl. .............................. 340/870.02; 340/870.01; 340/870.07; 340/870.28; 379/106.03; 375/132; 370/238
(58) Field of Classification Search ............ 340/870.02, 340/870.01, 870.07, 870.2, 870.28, 825.64; 379/106.03; 375/132; 370/238; 705/412
    See application file for complete search history.

(56) References Cited

U.S. PATENT DOCUMENTS 3,806,875 A * 4/1974 Georget ................. 340/870.02
4,120,031 A   10/1978 Kincheloe et al.

(Continued)

FOREIGN PATENT DOCUMENTS

WO    WO 94/29825 A    12/1994

(Continued)

OTHER PUBLICATIONS

Kahn, Robert E., Gronemeyer, Steven A., Burchfiel, Jerry, and Kunzelman, Ronald C., "*Advances in Packet Radio Technology*," IEEE Nov. 1978, vol. 66, No. 11, pp. 1468-1496.

(Continued)

*Primary Examiner*—Davetta W. Goins
*Assistant Examiner*—Sisay Yacob
(74) *Attorney, Agent, or Firm*—Bracewell & Giuliani, LLP

(57)    ABSTRACT

An automated meter reading system, communication and control for automated meter reading, a meter data collector, and associated methods are provided. The system includes at least one utility meter, at least one meter sensor interfaced with the utility meter, a meter data collector positioned adjacent the utility meter and positioned to receive data from the at least one sensor, and a remote automatic meter reading control center positioned to receive data from the collector such as through RF or other types of communication to gather and process usage reading data. Meter usage data is obtained by the collector from the meter sensor, date and time stamped, and stored in the collector until directly transmitted to the control center or a substation if within range and not blocked or impeded by a physical structure or other obstacle. If the collector is not in range, then the data is forwarded to another collector associated with a location closer to the control center or substation.

23 Claims, 19 Drawing Sheets

U.S. PATENT DOCUMENTS

| | | | |
|---|---|---|---|
| 4,803,484 A | | 2/1989 | Schutrum et al. |
| 4,811,011 A | * | 3/1989 | Sollinger ............... 340/870.02 |
| 5,115,433 A | | 5/1992 | Baran et al. |
| 5,128,988 A | | 7/1992 | Cowell et al. |
| 5,239,294 A | | 8/1993 | Flanders et al. |
| 5,265,150 A | | 11/1993 | Helmkamp et al. |
| 5,282,204 A | | 1/1994 | Shpancer et al. |
| 5,295,154 A | | 3/1994 | Meier et al. |
| 5,323,384 A | | 6/1994 | Norwood et al. |
| 5,467,345 A | | 11/1995 | Cutler et al. |
| 5,559,894 A | | 9/1996 | Lubliner et al. |
| 5,568,399 A | | 10/1996 | Sumic |
| 5,589,834 A | | 12/1996 | Weinberg |
| 5,592,491 A | | 1/1997 | Dinkins |
| 5,708,655 A | | 1/1998 | Toth |
| 5,732,078 A | | 3/1998 | Arango |
| 5,737,400 A | | 4/1998 | Bagchi et al. |
| 5,748,619 A | | 5/1998 | Meier |
| 5,757,783 A | | 5/1998 | Eng et al. |
| 5,790,938 A | | 8/1998 | Talarmo |
| 5,856,791 A | | 1/1999 | Gray et al. |
| 5,907,540 A | | 5/1999 | Hayashi |
| 5,960,074 A | | 9/1999 | Clark |
| 5,978,364 A | | 11/1999 | Melnik |
| 6,026,651 A | | 2/2000 | Sandelman |
| 6,029,092 A | | 2/2000 | Stein |
| 6,044,062 A | | 3/2000 | Brownrigg et al. |
| 6,069,571 A | | 5/2000 | Tell |
| 6,073,169 A | | 6/2000 | Shuey et al. |
| 6,078,785 A | * | 6/2000 | Bush ............................ 455/7 |
| 6,088,659 A | | 7/2000 | Kelley et al. |
| 6,163,602 A | | 12/2000 | Hammond et al. |
| 6,172,616 B1 | * | 1/2001 | Johnson et al. ........ 340/870.12 |
| 6,177,884 B1 | | 1/2001 | Hunt et al. |
| 6,199,068 B1 | | 3/2001 | Carpenter |
| 6,249,516 B1 | | 6/2001 | Brownrigg et al. |
| 6,259,972 B1 | | 7/2001 | Sumic et al. |
| 6,329,928 B1 | | 12/2001 | Hershey |
| 6,333,975 B1 | * | 12/2001 | Brunn et al. ........... 379/106.03 |
| 6,346,875 B1 | | 2/2002 | Puckette et al. |
| 6,363,057 B1 | | 3/2002 | Ardalan et al. |
| 6,396,839 B1 | | 5/2002 | Ardalan et al. |
| 6,496,575 B1 | | 12/2002 | Vasell et al. |
| 6,657,552 B2 | * | 12/2003 | Belski et al. ........... 340/870.02 |
| 6,731,223 B1 | * | 5/2004 | Partyka ................. 340/870.15 |
| 7,020,701 B1 | * | 3/2006 | Gelvin et al. ............... 709/224 |
| 7,054,271 B2 | | 5/2006 | Brownrigg et al. |
| 7,061,924 B1 | | 6/2006 | Durrant et al. ............... 370/401 |
| 2002/0109607 A1 | * | 8/2002 | Cumeralto et al. ..... 340/870.02 |
| 2002/0145568 A1 | * | 10/2002 | Winter ....................... 343/701 |
| 2005/0055432 A1 | | 3/2005 | Rodgers et al. |
| 2006/0098576 A1 | | 5/2006 | Brownrigg et al. |

FOREIGN PATENT DOCUMENTS

| | | |
|---|---|---|
| WO | WO 96/18982 A | 6/1996 |
| WO | WO 95/34177 | 12/2005 |

OTHER PUBLICATIONS

Perkins, Charles E. and Bhagwat, Pravin, "*Highly Dynamic Destination-Sequenced Distance-Vector Routing* (DSDV) for Mobile Computers, "SIGCOMM 94-Aug. 1994 London England UK, 1994 ACM 0-89791-682-4/94/0008, pp. 234-244.

Wu, Jie, "*Distributed System Design*." ISBN 0-8493-3178-1, Boca Raton, Fl., CRC Press LLC 1999, pp. 177-180 and 204.

Jubin, John and Tornow, Janet D., "*The DARPA Packet Radio Network Protocols*," Proceedings of the IEEE, vol. 75, No. 1, Jan. 1987, pp. 21-32.

Kleinrock, Leonard and Kamoun, Frouk, "*Hierarchical Routing for Large Networks*," North-Holland Publishing.

Company, Computer Networks 1, 1997, pp. 155-174.

Frankel, Michael S., Packet Radios Provide Link for Distributed, Survivable $C^3$ in Post-Attack Scenarios, MSN Jun. 1983.

Lauer, Greg et al., "Communications in the Information Age," pp. 15.1.1-15.1.4, IEEE Globecom '84, 1984.

WestCott, Jil A., "Issues in Distributed Routing for Mobile Packet Radio Network," IEEE 1982, pp. 233-238.

Westcott, Jil et al., "A Distributed Routing Design for a Broadcast Environment", IEEE 1982, pp. 10.4-1-10.4-5.

Kahn, Robert E., The Organization of Computer Resources into a Packet Radio Network, IEEE Jan. 1977, vol. Com-23, No. 1, pp. 169-178.

MacGregor, William et al., "Multiple Control Stations in Packet Radio Networks," IEEE 1982, 10.3-1-10.3-5.

Shacham, Nachum et al., "Future Directions in Packet Radio Technology,"IEEE 1985, pp. 93-98.

Jubin, John, "Current Packet Radio Network Protocols,"IEEE 1985, pp. 86-92.

Gower, Neil et al ., "Congestion Control Using Pacing in a Packet Radio Network," IEEE 1982, pp. 23.1-1-23.1-6.

Wey, Jyhi-Kong, Chang, Han-Tsung, Sun Lir-Fan and Yang, Wei-Pang, *Clone Terminator: An Authentication Services for Advanced Mobile Phone System*.

Davis, Alvah B and Goyal, Shri K., "Knowledge-Based Management of Cellular Clone Faud." *IEEE 1992*, pp. 230-234.

Schacham, et al., "A Packet Radio Network For Library Automation", published by IEEE in Oct. 1978, p. 21.3.1 to 21.3.7.

Clifford Lynch et al, "Packet Radio Networks: Architectures, Protocols, Technologies and Applications" published by Pergamon Press in 1989, pp. 1 to 166 and pp. 211 to 274.

Edward Brownrigg, "User Provided Access to the Internet", found at http/web.simmons.edu, Jun. 9, 2005.

* cited by examiner

ETG QNL-RCU-41 Frequency List

| RX SETTING | TX SETTING | | | FREQUENCY |
|---|---|---|---|---|
| { 0x3CE521 | , 0x3CEA77 | } | , // | 909300000 (0x00) |
| { 0x3DE7CF | , 0x3DED25 | } | , // | 924200000 (0x01) |
| { 0x3CB9B9 | , 0x3CBF0F | } | , // | 906800000 (0x02) |
| { 0x3D21E5 | , 0x3D2739 | } | , // | 912800000 (0x03) |
| { 0x3CBB77 | , 0x3CC0CB | } | , // | 906900000 (0x04) |
| { 0x3D42E1 | , 0x3D4837 | } | , // | 914700000 (0x05) |
| { 0x3D2E0B | , 0x3D3361 | } | , // | 913500000 (0x06) |
| { 0x3CBEEF | , 0x3CC445 | } | , // | 907100000 (0x07) |
| { 0x3E0E01 | , 0x3E1357 | } | , // | 926400000 (0x08) |
| { 0x3D1E6B | , 0x3D23C1 | } | , // | 912600000 (0x09) |
| { 0x3CF67D | , 0x3CFBD3 | } | , // | 910300000 (0x0A) |
| { 0x3D1245 | , 0x3D1799 | } | , // | 911900000 (0x0B) |
| { 0x3DCA4B | , 0x3DCFA1 | } | , // | 922500000 (0x0C) |
| { 0x3D15BD | , 0x3D1B13 | } | , // | 912100000 (0x0D) |
| { 0x3CF839 | , 0x3CFD8F | } | , // | 910400000 (0x0E) |
| { 0x3DCF81 | , 0x3DD4D7 | } | , // | 922800000 (0x0F) |
| { 0x3DED05 | , 0x3DF259 | } | , // | 924500000 (0x10) |
| { 0x3CCE8F | , 0x3CD3E5 | } | , // | 908000000 (0x11) |
| { 0x3D6065 | , 0x3D65B9 | } | , // | 916400000 (0x12) |
| { 0x3C9389 | , 0x3C98DD | } | , // | 904600000 (0x13) |
| { 0x3CD581 | , 0x3CDAD7 | } | , // | 908400000 (0x14) |
| { 0x3E264F | , 0x3E2BA5 | } | , // | 927800000 (0x15) |
| { 0x3D8853 | , 0x3D8DA9 | } | , // | 918700000 (0x16) |
| { 0x3DDF21 | , 0x3DE477 | } | , // | 923700000 (0x17) |
| { 0x3D8F45 | , 0x3D9499 | } | , // | 919100000 (0x18) |
| { 0x3CB641 | , 0x3CBB97 | } | , // | 906600000 (0x19) |
| { 0x3DA419 | , 0x3DA96F | } | , // | 920300000 (0x1A) |
| { 0x3D2029 | , 0x3D257D | } | , // | 912700000 (0x1B) |
| { 0x3CEDCF | , 0x3CF325 | } | , // | 909800000 (0x1C) |
| { 0x3D0B53 | , 0x3D10A9 | } | , // | 911500000 (0x1D) |
| { 0x3CF149 | , 0x3CF69D | } | , // | 910000000 (0x1E) |
| { 0x3D6C8B | , 0x3D71E1 | } | , // | 917100000 (0x1F) |
| { 0x3D255D | , 0x3D2AB3 | } | , // | 913000000 (0x20) |
| { 0x3D5281 | , 0x3D57D7 | } | , // | 915600000 (0x21) |
| { 0x3D1779 | , 0x3D1CCF | } | , // | 912200000 (0x22) |
| { 0x3DBE25 | , 0x3DC379 | } | , // | 921800000 (0x23) |
| { 0x3CA16B | , 0x3CA6C1 | } | , // | 905400000 (0x24) |
| { 0x3DE613 | , 0x3DEB69 | } | , // | 924100000 (0x25) |
| { 0x3DEB49 | , 0x3DF09D | } | , // | 924400000 (0x26) |
| { 0x3D55F9 | , 0x3D5B4F | } | , // | 915800000 (0x27) |
| { 0x3D50C5 | , 0x3D5619 | } | , // | 915500000 (0x28) |
| { 0x3D02A5 | , 0x3D07F9 | } | , // | 911000000 (0x29) |
| { 0x3E001D | , 0x3E0573 | } | , // | 925600000 (0x2A) |
| { 0x3C6F13 | , 0x3C7469 | } | , // | 902500000 (0x2B) |
| { 0x3DA0A1 | , 0x3DA5F7 | } | , // | 920100000 (0x2C) |
| { 0x3E22D7 | , 0x3E282B | } | , // | 927600000 (0x2D) |
| { 0x3D3BEF | , 0x3D4145 | } | , // | 914300000 (0x2E) |
| { 0x3CC5E1 | , 0x3CCB37 | } | , // | 907500000 (0x2F) |
| { 0x3CDFEB | , 0x3CE541 | } | , // | 909000000 (0x30) |
| { 0x3D2719 | , 0x3D2C6F | } | , // | 913100000 (0x31) |
| { 0x3C8C97 | , 0x3C91EB | } | , // | 904200000 (0x32) |
| { 0x3DD9EB | , 0x3DDF41 | } | , // | 923400000 (0x33) |
| { 0x3D7DE9 | , 0x3D833D | } | , // | 918100000 (0x34) |
| { 0x3C7CF7 | , 0x3C824B | } | , // | 903300000 (0x35) |

*FIG. 15A.*

ETG QNL-RCU-41 Frequency List (continued)

| RX SETTING | TX SETTING | | | FREQUENCY |
|---|---|---|---|---|
| { 0x3C9545 | , 0x3C9A99 | } | , // | 904700000 (0x36) |
| { 0x3CFBB3 | , 0x3D0109 | } | , // | 910800000 (0x37) |
| { 0x3E0563 | , 0x3E0AA9 | } | , // | 925900000 (0x38) |
| { 0x3D8161 | , 0x3D86B7 | } | , // | 918300000 (0x39) |
| { 0x3D5CEB | , 0x3D6241 | } | , // | 916200000 (0x3A) |
| { 0x3CC425 | , 0x3CC979 | } | , // | 907400000 (0x3B) |
| { 0x3DF76F | , 0x3DFCC5 | } | , // | 925100000 (0x3C) |
| { 0x3D9B6B | , 0x3DA0C1 | } | , // | 919800000 (0x3D) |
| { 0x3C891D | , 0x3C8E73 | } | , // | 904000000 (0x3E) |
| { 0x3DA94F | , 0x3DAEA5 | } | , // | 920600000 (0x4F) |
| { 0x3CEA57 | , 0x3CEFAB | } | , // | 909600000 (0x40) |
| { 0x3DC88F | , 0x3DCDE5 | } | , // | 922400000 (0x41) |
| { 0x3D1401 | , 0x3D1957 | } | , // | 912000000 (0x42) |
| { 0x3D831D | , 0x3D8873 | } | , // | 918400000 (0x43) |
| { 0x3D00E9 | , 0x3D063D | } | , // | 910900000 (0x44) |
| { 0x3D36B9 | , 0x3D3C0F | } | , // | 914000000 (0x45) |
| { 0x3D6221 | , 0x3D6777 | } | , // | 916500000 (0x46) |
| { 0x3D97F3 | , 0x3D9D49 | } | , // | 919600000 (0x47) |
| { 0x3DFCA5 | , 0x3E01F9 | } | , // | 925400000 (0x48) |
| { 0x3D9637 | , 0x3D9B8B | } | , // | 919500000 (0x49) |
| { 0x3DC359 | , 0x3DC8AF | } | , // | 922100000 (0x4A) |
| { 0x3D23A1 | , 0x3D28F7 | } | , // | 912900000 (0x4B) |
| { 0x3D84D9 | , 0x3D8A2F | } | , // | 918500000 (0x4C) |
| { 0x3C85A5 | , 0x3C8AF9 | } | , // | 903800000 (0x4D) |
| { 0x3D4817 | , 0x3D4D6B | } | , // | 915000000 (0x4E) |
| { 0x3D061D | , 0x3D0B73 | } | , // | 911200000 (0x4F) |
| { 0x3E08CB | , 0x3E0E21 | } | , // | 926100000 (0x50) |
| { 0x3DD4B7 | , 0x3DDA0B | } | , // | 923100000 (0x51) |
| { 0x3D76F7 | , 0x3D7C4B | } | , // | 917700000 (0x52) |
| { 0x3D4125 | , 0x3D4679 | } | , // | 914600000 (0x53) |
| { 0x3E1BE5 | , 0x3E2139 | } | , // | 927200000 (0x54) |
| { 0x3E1337 | , 0x3E188B | } | , // | 926700000 (0x55) |
| { 0x3D63DD | , 0x3D6933 | } | , // | 916600000 (0x56) |
| { 0x3D2C4F | , 0x3D31A5 | } | , // | 913400000 (0x57) |
| { 0x3D78B3 | , 0x3D7E09 | } | , // | 917800000 (0x58) |
| { 0x3D1937 | , 0x3D1E8B | } | , // | 912300000 (0x59) |
| { 0x3D9D29 | , 0x3DA27D | } | , // | 919900000 (0x5A) |
| { 0x3CDE2F | , 0x3CE385 | } | , // | 908900000 (0x5B) |
| { 0x3D0461 | , 0x3D09B7 | } | , // | 911100000 (0x5C) |
| { 0x3CEC13 | , 0x3CF169 | } | , // | 909700000 (0x5D) |
| { 0x3D6757 | , 0x3D6CAB | } | , // | 916800000 (0x5E) |
| { 0x3DC617 | , 0x3DCA6B | } | , // | 922200000 (0x5F) |
| { 0x3CFD6F | , 0x3D02C5 | } | , // | 910700000 (0x60) |
| { 0x3D8BCB | , 0x3D9121 | } | , // | 910900000 (0x61) |
| { 0x3D9EE5 | , 0x3DA439 | } | , // | 920000000 (0x62) |
| { 0x3CF9F7 | , 0x3CFF4B | } | , // | 910500000 (0x63) |
| { 0x3D2FC9 | , 0x3D351D | } | , // | 913600000 (0x64) |
| { 0x3E0397 | , 0x3E08EB | } | , // | 925800000 (0x65) |
| { 0x3DFAE9 | , 0x3E003D | } | , // | 925300000 (0x66) |
| { 0x3CD04B | , 0x3CD5A1 | } | , // | 908100000 (0x67) |
| { 0x3D28D7 | , 0x3D2E2B | } | , // | 913200000 (0x68) |
| { 0x3DE0DD | , 0x3DE633 | } | , // | 923800000 (0x69) |
| { 0x3D7539 | , 0x3D7A8F | } | , // | 917600000 (0x6A) |
| { 0x3DDBA9 | , 0x3DE0FD | } | , // | 923500000 (0x6B) |
| { 0x3CC79D | , 0x3CCCF3 | } | , // | 907600000 (0x6C) |
| { 0x3D3877 | , 0x3D3DCB | } | , // | 914100000 (0x6D) |

*FIG. 15B.*

ETG QNL-RCU-41 Frequency List (continued)

| RX SETTING | TX SETTING | | | | FREQUENCY |
|---|---|---|---|---|---|
| 0x3D1089 | 0x3D15DD | } | , | // | 911800000 (0x6E) |
| 0x3D88EF | 0x3DBE45 | } | , | // | 921500000 (0x6F) |
| 0x3D2A93 | 0x3D2FE9 | } | , | // | 913300000 (0x70) |
| 0x3C77C1 | 0x3C7D17 | } | , | // | 903000000 (0x71) |
| 0x3CABD7 | 0x3CB12B | } | , | // | 906000000 (0x72) |
| 0x3CDAB7 | 0x3CE00B | } | , | // | 908700000 (0x73) |
| 0x3E2119 | 0x3E266F | } | , | // | 927500000 (0x74) |
| 0x3E0C45 | 0x3E1199 | } | , | // | 926300000 (0x75) |
| 0x3D99AF | 0x3D9F05 | } | , | // | 919700000 (0x76) |
| 0x3DD82F | 0x3DDD85 | } | , | // | 923300000 (0x77) |
| 0x3C70CF | 0x3C7625 | } | , | // | 902600000 (0x78) |
| 0x3CF305 | 0x3CF859 | } | , | // | 910100000 (0x79) |
| 0x3CB10B | 0x3CB661 | } | , | // | 906300000 (0x7A) |
| 0x3E1F5D | 0x3E24B3 | } | , | // | 927400000 (0x7B) |
| 0x3C6D57 | 0x3C72AB | } | , | // | 902400000 (0x7C) |
| 0x3D3341 | 0x3D3897 | } | , | // | 913800000 (0x7D) |
| 0x3D543D | 0x3D5993 | } | , | // | 915700000 (0x7E) |
| 0x3DBFE1 | 0x3DC537 | } | , | // | 921900000 (0x7F) |
| 0x3C7EB3 | 0x3C8409 | } | , | // | 903400000 (0x80) |
| 0x3DF5B3 | 0x3DFB09 | } | , | // | 925000000 (0x81) |
| 0x3DB041 | 0x3DB597 | } | , | // | 921000000 (0x82) |
| 0x3C7449 | 0x3C799D | } | , | // | 902800000 (0x83) |
| 0x3CFF2B | 0x3D0481 | } | , | // | 910800000 (0x84) |
| 0x3DFE61 | 0x3E03B7 | } | , | // | 925500000 (0x85) |
| 0x3CB2C9 | 0x3CB81D | } | , | // | 906400000 (0x86) |
| 0x3CEF8B | 0x3CF4E1 | } | , | // | 909900000 (0x87) |
| 0x3D7FA5 | 0x31384179 | } | , | // | 918200000 (0x88) |
| 0x3DBC69 | 0x3DC1BD | } | , | // | 921700000 (0x89) |
| 0x3D3185 | 0x3D36D9 | } | , | // | 913700000 (0x8A) |
| 0x3CD209 | 0x3CD75D | } | , | // | 908200000 (0x8B) |
| 0x3DC6D3 | 0x3DCC29 | } | , | // | 922300000 (0x8C) |
| 0x3E14F3 | 0x3E1A49 | } | , | // | 926800000 (0x8D) |
| 0x3DE98B | 0x3DEEE1 | } | , | // | 924300000 (0x8E) |
| 0x3C806F | 0x3C85C5 | } | , | // | 903500000 (0x8F) |
| 0x3CAD93 | 0x3CB2E9 | } | , | // | 906100000 (0x90) |
| 0x3E280B | 0x3E2D61 | } | , | // | 927900000 (0x91) |
| 0x3D0ECB | 0x3D1421 | } | , | // | 911700000 (0x92) |
| 0x3DE299 | 0x3DE7EF | } | , | // | 923900000 (0x93) |
| 0x3DB733 | 0x3DBC89 | } | , | // | 921400000 (0x94) |
| 0x3E1A29 | 0x3E1F7D | } | , | // | 927100000 (0x95) |
| 0x3DD13D | 0x3DD693 | } | , | // | 922900000 (0x96) |
| 0x3D3A33 | 0x3D3F89 | } | , | // | 914200000 (0x97) |
| 0x3DACC9 | 0x3DB21D | } | , | // | 920800000 (0x98) |
| 0x3D3F69 | 0x3D44BD | } | , | // | 914500000 (0x99) |
| 0x3CA329 | 0x3CA87D | } | , | // | 905500000 (0x9A) |
| 0x3D0997 | 0x3D0EEB | } | , | // | 911400000 (0x9B) |
| 0x3DEEC1 | 0x3DF417 | } | , | // | 924600000 (0x9C) |
| 0x3CC959 | 0x3CCEAF | } | , | // | 907700000 (0x9D) |
| 0x3C728B | 0x3C77E1 | } | , | // | 902700000 (0x9E) |
| 0x3D1AF3 | 0x3D2049 | } | , | // | 912400000 (0x9F) |
| 0x3DD673 | 0x3DDBC9 | } | , | // | 923200000 (0xA0) |
| 0x3D5EA9 | 0x3D63FD | } | , | // | 916300000 (0xA1) |
| 0x3D7005 | 0x3D7559 | } | , | // | 917300000 (0xA2) |
| 0x3D4B8F | 0x3D50E5 | } | , | // | 915200000 (0xA3) |
| 0x3CE365 | 0x3CE8B9 | } | , | // | 909200000 (0xA4) |
| 0x3C9C37 | 0x3CA18B | } | , | // | 905100000 (0xA5) |

FIG. 15C.

ETG QNL-RCU-41 Frequency List (continued)

| RX SETTING | TX SETTING | | | FREQUENCY |
|---|---|---|---|---|
| { 0x3D6599 | , 0x3D6AEF | } | , // | 916700000 (0xA6) |
| { 0x3DAB0B | , 0x3DB061 | } | , // | 920700000 (0xA7) |
| { 0x3C91CB | , 0x3C9721 | } | , // | 904500000 (0xA8) |
| { 0x3DCDC5 | , 0x3DD319 | } | , // | 922700000 (0xA9) |
| { 0x3DA793 | , 0x3DACE9 | } | , // | 920500000 (0xAA) |
| { 0x3C900F | , 0x3C9565 | } | , // | 904400000 (0xAB) |
| { 0x3C9FAF | , 0x3CA505 | } | , // | 905300000 (0xAC) |
| { 0x3D4D4B | , 0x3D52A1 | } | , // | 915300000 (0xAD) |
| { 0x3D1CAF | , 0x3D2205 | } | , // | 912500000 (0xAE) |
| { 0x3C7B39 | , 0x3C808F | } | , // | 903200000 (0xAF) |
| { 0x3D4859 | , 0x3D4BAF | } | , // | 914900000 (0xB0) |
| { 0x3DF07D | , 0x3DF5D3 | } | , // | 924700000 (0xB1) |
| { 0x3DDD63 | , 0x3DE2B9 | } | , // | 923600000 (0xB2) |
| { 0x3E1179 | , 0x3E16CF | } | , // | 926600000 (0xB3) |
| { 0x3DBAAB | , 0x3DC001 | } | , // | 921600000 (0xB4) |
| { 0x3DD2F9 | , 0x3DD84F | } | , // | 923000000 (0xB5) |
| { 0x3DF3F7 | , 0x3DF94B | } | , // | 924900000 (0xB6) |
| { 0x3C8761 | , 0x3C8CB7 | } | , // | 903900000 (0xB7) |
| { 0x3D6E49 | , 0x3D739D | } | , // | 917200000 (0xB8) |
| { 0x3D6913 | , 0x3D6E69 | } | , // | 916900000 (0xB9) |
| { 0x3E070F | , 0x3E0C65 | } | , // | 926000000 (0xBA) |
| { 0x3C8AD9 | , 0x3C902F | } | , // | 904100000 (0xBB) |
| { 0x3D3DAB | , 0x3D4301 | } | , // | 914400000 (0xBC) |
| { 0x3CDC73 | , 0x3CE1C9 | } | , // | 908800000 (0xBD) |
| { 0x3D6ACF | , 0x3D7025 | } | , // | 917000000 (0xBE) |
| { 0x3DF239 | , 0x3DF78F | } | , // | 924800000 (0xBF) |
| { 0x3E2493 | , 0x3E29E9 | } | , // | 927700000 (0xC0) |
| { 0x3E186B | , 0x3E1DC1 | } | , // | 927000000 (0xC1) |
| { 0x3D49D3 | , 0x3D4F29 | } | , // | 915100000 (0xC2) |
| { 0x3D4F09 | , 0x3D545D | } | , // | 915400000 (0xC3) |
| { 0x3CCB17 | , 0x3CD06B | } | , // | 907800000 (0xC4) |
| { 0x3D92BD | , 0x3D9813 | } | , // | 919300000 (0xC5) |
| { 0x3C9DF3 | , 0x3CA349 | } | , // | 905200000 (0xC6) |
| { 0x3D07D9 | , 0x3D0D2F | } | , // | 911300000 (0xC7) |
| { 0x3D8D89 | , 0x3D92DD | } | , // | 919000000 (0xC8) |
| { 0x3DF92B | , 0x3DFE81 | } | , // | 925200000 (0xC9) |
| { 0x3CBD33 | , 0x3CC289 | } | , // | 907000000 (0xCA) |
| { 0x3D737D | , 0x3D78D3 | } | , // | 917500000 (0xCB) |
| { 0x3D34FD | , 0x3D3A53 | } | , // | 913900000 (0xCC) |
| { 0x3CC0AB | , 0x3CC601 | } | , // | 907200000 (0xCD) |
| { 0x3C9701 | , 0x3C9C57 | } | , // | 904800000 (0xCE) |
| { 0x3CAA19 | , 0x3CAF6F | } | , // | 905900000 (0xCF) |
| { 0x3DA5D7 | , 0x3DAB2B | } | , // | 920400000 (0xD0) |
| { 0x3CB7FD | , 0x3CBD53 | } | , // | 906700000 (0xD1) |
| { 0x3CE899 | , 0x3CEDEF | } | , // | 909500000 (0xD2) |
| { 0x3CCCD3 | , 0x3CD229 | } | , // | 907900000 (0xD3) |
| { 0x3E01D9 | , 0x3E072F | } | , // | 925700000 (0xD4) |
| { 0x3C7605 | , 0x3C7B59 | } | , // | 902900000 (0xD5) |
| { 0x3D5973 | , 0x3D5EC9 | } | , // | 916000000 (0xD6) |
| { 0x3C9A79 | , 0x3C9FCF | } | , // | 905000000 (0xD7) |
| { 0x3D71C1 | , 0x3D7717 | } | , // | 917400000 (0xD8) |
| { 0x3D5B2F | , 0x3D6085 | } | , // | 916100000 (0xD9) |
| { 0x3C797D | , 0x3C7ED3 | } | , // | 903100000 (0xDA) |
| { 0x3D8697 | , 0x3D8BEB | } | , . // | 918600000 (0xDB) |
| { 0x3CB485 | , 0x3CB9D9 | } | , // | 906500000 (0xDC) |
| { 0x3D9101 | , 0x3D9657 | } | , // | 919200000 (0xDD) |

FIG. 15D.

ETG QNL-RCU-41 Frequency List (continued)

| RX SETTING | | TX SETTING | | | FREQUENCY |
|---|---|---|---|---|---|
| { 0x3DE457 | , | 0x3DE9AB | } | , // | 924000000 (0xDE) |
| { 0x3CA85D | , | 0x3CADB3 | } | , // | 905800000 (0xDF) |
| { 0x3DB1FD | , | 0x3DB753 | } | , // | 921100000 (0xE0) |
| { 0x3DC19D | , | 0x3DC6F3 | } | , // | 922000000 (0xE1) |
| { 0x3E0FBD | , | 0x3E1513 | } | , // | 926500000 (0xE2) |
| { 0x3D0D0F | , | 0x3D1265 | } | , // | 911600000 (0xE3) |
| { 0x3D7A6F | , | 0x3D7FC5 | } | , // | 917900000 (0xE4) |
| { 0x3C83E9 | , | 0x3C893D | } | , // | 903700000 (0xE5) |
| { 0x3D7C2B | , | 0x3D8181 | } | , // | 918000000 (0xE6) |
| { 0x3C98BD | , | 0x3C9E13 | } | , // | 904900000 (0xE7) |
| { 0x3CAF4F | , | 0x3CB4A5 | } | , // | 906200000 (0xE8) |
| { 0x3DB3B9 | , | 0x3DB90F | } | , // | 921200000 (0xE9) |
| { 0x3E1DA1 | , | 0x3E22F7 | } | , // | 927300000 (0xEA) |
| { 0x3CA6A1 | , | 0x3CABF7 | } | , // | 905700000 (0xEB) |
| { 0x3CF4C1 | , | 0x3CFA17 | } | , // | 910200000 (0xEC) |
| { 0x3DAE85 | , | 0x3DB3D9 | } | , // | 920900000 (0xED) |
| { 0x3CA4E5 | , | 0x3CAA39 | } | , // | 905600000 (0xEE) |
| { 0x3C8E53 | , | 0x3C93A9 | } | , // | 904300000 (0xEF) |
| { 0x3E0A89 | , | 0x3E0FDD | } | , // | 926200000 (0xF0) |
| { 0x3D8A0F | , | 0x3D8F65 | } | , // | 918800000 (0xF1) |
| { 0x3CD73D | , | 0x3CDC93 | } | , // | 908500000 (0xF2) |
| { 0x3DCC09 | , | 0x3DD15D | } | , // | 922600000 (0xF3) |
| { 0x3D449D | , | 0x3D49F3 | } | , // | 914800000 (0xF4) |
| { 0x3CD8F9 | , | 0x3CDE4F | } | , // | 908600000 (0xF5) |
| { 0x3E16AF | , | 0x3E1C05 | } | , // | 926900000 (0xF6) |
| { 0x3CC26 | , | 0x3CC7BD | } | , // | 907300000 (0xF7) |
| { 0x3D9479 | , | 0x3D99CF | } | , // | 919400000 (0xF8) |
| { 0x3CD3C5 | , | 0x3CD919 | } | , // | 908300000 (0xF9) |
| { 0x3CE1A9 | , | 0x3CE6FD | } | , // | 909100000 (0xFA) |
| { 0x3DB577 | , | 0x3DBACB | } | , // | 921300000 (0xFB) |
| { 0x3C822B | , | 0x3C8781 | } | , // | 903600000 (0xFC) |
| { 0x3D57B7 | , | 0x3D5D0B | } | , // | 915900000 (0xFD) |
| { 0x3CE6DD | , | 0x3CEC33 | } | , // | 909400000 (0xFE) |
| { 0x3DA25D | , | 0x3DA7B3 | } | , // | 920200000 (0xFF) |

*FIG. 15E.*

AUTOMATED METER READING SYSTEM, COMMUNICATION AND CONTROL NETWORK FOR AUTOMATED METER READING, METER DATA COLLECTOR, AND ASSOCIATED METHODS

RELATED APPLICATIONS

This is a non-provisional patent application, which claims the priority of provisional patent application U.S. Ser. No. 60/447,815, filed Feb. 14, 2003, titled Automated Meter Reading System, Communication and Control Network for Automated Meter Reading, Meter Data Collector, and Associated Methods, and which is incorporated herein by reference in its entirety.

BACKGROUND

1. Field of the Invention

The present invention relates in general to the field of utility meters. More particularly, the present invention relates to automatic equipment, systems, networks, and software for remote reading of utility meters, such as electric, gas, water, or steam meters.

2. Description of Related Art

Utility companies and municipalities for many years have been burdened with the labor intensive and cumbersome task of manually collecting meter readings, managing data from the field into the accounting area, and managing the billing and collection of invoices. Typically each customer is provided with a mechanical utility meter for each individual service provided, for example, a meter for water, a meter for steam, a meter for gas, and a meter for electric power. A periodic reading of the utility meter is necessary to determine the usage and to bill the customer for the amount used. These meters are normally manually read using utility company or municipality employees physically visiting each meter at the customer's location, reading the meter, and recording the previous month's usage into a written route book for delivery to accounting personnel. This process is costly, is time consuming, and can involve various risks to personnel involved in manually collecting meter data. The process involves labor, motorized transportation, and numerous employee overhead-related costs. Once the readings from the meter are obtained, accounting personnel manually transfer the readings into a database for billing and collection of the invoices for service.

Manually reading the meters often results in numerous other expenses including those related to human error. For example, a high bill caused by an incorrect manual read or estimated read often motivates customers to pay later, resulting in increased working capital requirements and corresponding expenses for the utility. Additionally, the utility has to handle the customer complaints (a call center cost) and may have to read the meter again to verify the error. As the complaint progresses, the utility faces administrative costs associated with routing and processing the complaint from the call center to the meter department. An additional cost includes the potential loss of a customer who, even after resolution, feels the process was such an excessive burden as to prompt the customer to switch utility providers.

Recently, hand-held reading units have been developed that typically provide a data collection unit attached to the consumer's utility meter having some form of data transmitter. The unit or system has some form of receiver. There are different variations in methodology of receiving the data. One methodology of hand-held "local" collecting meter reading requires an operator having a meter or collection unit interrogation device to be in close physical proximity of the meter to obtain the meter reading and transport the data to a central computer such as shown in U.S. Pat. No. 5,559,894 by Lubliner et al. titled "Automated Meter Inspection and Reading" and U.S. Pat. No. 5,856,791 by Gray et al. titled "Port Expander For Utility Meter Reading." For example, in a radio drive-by or walk-by unit, a utility service vehicle having a mobile receiver mounted in a service vehicle or a utility worker having a hand-held unit passes by the consumer's facility to receive the data from the meter. As the vehicle or hand-held unit passes near the electric meter, the receiver emits a signal to the collection unit, which causes the collection unit to transmit or send its meter reading data to the receiver. This consumption data is then stored and later entered into a billing system. This approach, however, still requires the manual visit to each meter location and time downloading the data to the billing system. Nevertheless, the physical meters can be read much more quickly which reduces manpower, vehicular, and soft costs. Also, the data is transferred from the mobile receiver to the database, which again reduces manpower and data handling. This methodology also has a benefit to the customer of preventing intrusion into the customer's premises and improved accuracy of the reading. Remaining system negatives, however, included prohibitive capital costs, i.e., vehicles, and software and hardware requirements, and providing a reliable and cost-effective power solution for the individual radio transmitter in the individual meters.

Recently, automatic meter reading ("AMR") has been developed. Automated meter reading has become more desirable than using meters that require manual reading and recording of the consumption levels. AMR consists of technologies and methods to remotely read a plurality of electric meters, such as a consumer base for an electric power supply company, into a billing database by installing or utilizing fixed networks that allow billing or meter usage data to be transmitted without human intervention to a host computer having the billing database. AMR produces many benefits and several companies such as Hunt Technologies, Schlumberger, CellNet, Itron, Amco Automated Systems, and Distribution Control Systems have developed AMR units. For the utility, reading meters without setting foot on customer's property substantially reduces risks associated with climbing over fences, slipping on ice and snow, dangerous animals, snakes, and spiders, and other types of risks which in turn, result in significant savings in liability insurance, disability benefits, and worker turnover/replacement. For the customer, reading meters without entering a customer's property provides a less intrusive service and reduces criminal activity such as when a criminal manages to gain entry into a customers property by posing as a meter reader. Moreover, the need for a higher frequency of meter reading is increasing, e.g., daily, hourly, or every 15 minutes, in order to take advantage of real time pricing. Also, the amount of data is increasing, due to the necessity to bill on more than just consumption, e.g., time of use. Thus, automated recording and reporting of the utility usage at customer sites is rapidly replacing the manually read utility meters.

AMR systems can use a dial-up modem in the collection unit to dial a remote billing system and transmit its reading data via telephone lines such as that shown in U.S. Pat. No. 6,163,602 by Hammond et al. titled "System and Method for Unified Telephone and Utility Consumption Metering, Reading, and Processing" and U.S. Pat. No. 5,128,988 by Cowell et al. titled "Telephone Switched Network, Automatic Meter-Reading System Based Upon Service Address." In the past, there have been on-site meter reading equipment having a modem capable of receiving telephone calls from a central office through the use of special equipment located at the telephone company, and there have also been on-site meters with modems which were capable of placing telephone calls to the central office. In general, these systems incorporate an auto-dial, auto-answer modem in each customer site to receive interrogation signals from the telephone line and to formulate and transmit meter readings via the telephone line to the utility company. These systems record information on utility usage and periodically dial into a central office to report the utility usage for recording and billing purposes. This methodology provides two-way communication and control between the meter and the central office. The modem shares the telephone line with the customer's normal usage, such as incoming and outgoing voice communications. Such sharing requires that the system be able to recognize when the telephone line is in use, and to delay demanding use of the telephone line until it is free. Steps must be taken to prevent the data communications system from interfering with other uses and to prevent other uses from corrupting the transmitted data.

A variation of this methodology includes using the power line as a carrier medium. This approach connects the meter through the power lines and relays the meter reading over the power lines to the utility company. This approach, however, can require a complicated infrastructure to be installed. Power lines operate as very large antennas and can receive a large amount of noise. Therefore, signal-cleaning filters must be installed periodically along the power lines to attenuate the noise. These filters can be very expensive. Also, the connections often are at line voltage, making it more dangerous and time consuming to install.

Another problem with expanding the use of control systems technology to such distributed systems are the costs associated with the sensor-actuator infrastructure required to monitor and control functions within such systems. A more modern approach to implementing control system technology is to install a local network of hard-wired sensors and actuators along with a local controller. Not only is there the expense associated with developing and installing appropriate sensors and actuators, but there is the added expense of connecting functional sensors and controllers with the local controller and the cost of the local controller. This methodology is also quite intrusive as the cables must be run to physically interconnect the various nodes in the network. An alternative variation includes interfacing the meter with a community cable television system. In addition to the high cost of installation, however, such a system is not useable in areas without access to a cable system. Moreover, networks that are interconnected with cables are subject to physical disruption of the cables.

Recently, wireless networks have been developed. These networks, typically installed in a point-to-point loop configuration, are used to collect information from and to disseminate information to individual nodes of the network. In conventional wireless networks using a point-to-point loop configuration, each node in the network is interconnected and communicates with two neighboring nodes. Information or commands are passed from node to node around the point-to-point loop until they arrive at a master node. The master node is used to communicate information that is gathered to a central station or to accept and distribute information received from a central station throughout the network. These conventional wireless networks, however, have limitations. For example, because these conventional wireless networks generally have a point-to-point loop configuration, when one node is disabled, the integrity of the entire network can be affected. Moreover, if the master node of such a conventional network is disabled, the network can become isolated.

Other variations in methodology include using data channels in wireless telephone systems to transmit usage data to a remote billing system via a wireless telephone network, such as PCS, satellite, or cellular. Other methodologies also include the use of low earth orbiting satellites. Building, launching and maintaining a fleet of satellites, however, is very expensive.

Yet another methodology includes the use of small RF transmitters. Because systems having sufficient range normally are subject to regulations and licensing requirements that are prohibitively expensive, however, the centralized wireless control systems for locally distributed devices using RF transmitters have not been widely utilized. Also, systems that are sufficiently powerful to be used in widely distributed installations are unnecessarily expensive in smaller installations. Additionally, there is limited availability of RF carrier frequencies, and potential interference with other nearby systems that might be operational.

Further AMR servers have been developed, such as shown in U.S. Pat. No. 6,088,659 by Kelley et al. titled "Automated Meter Reading System," in attempts to address the metering data management needs of entities involved in energy distribution. Such AMR servers use an open, distributed architecture that collects, loads, and manages system-wide data collected from energy meters and routes data automatically to upstream business systems. Although such AMR servers may address some meter data management concerns, these systems still fail to address communication concerns set forth above with respect to collecting billing or usage data and transmitting the data to a control center, e.g., perhaps having an AMR server.

SUMMARY OF THE INVENTION

In view of the foregoing, Applicant has recognized a need to automate and transform the process of metering electricity, gas, water, steam, and the like, while reducing costs, adding value, enhancing service, and decreasing time of collection.

When utilities such as gas, electricity, or water are most expensive to the customer, they are also correspondingly most expensive to the utility company. Accordingly, Applicant also has recognized a need for control systems technology such distributed systems that provide the customer with information to reduce costs and help the utility by reducing demand at peak hours. Applicant further has recognized a need for a fixed network AMR that includes a multifunction data collector capable of transmitting meter readings for multiple meters to the control center and relaying meter readings of other collectors.

An embodiment of the present invention advantageously provides a distributed network system including at least one utility meter, and preferably a plurality of utility meters, at least one sensor interfaced with each meter, a meter data collector positioned in communication with the at least one sensor to receive meter usage reading data. The system also includes a remote automatic meter reading control center including a computer, e.g., a server, for gathering and processing the usage reading data. The system also includes system software associated with the computer of the remote control center and associated with the collector. Preferably, the system software has network software including a network protocol, e.g., preferably a preselected application layer protocol, to communicate over a network connected to each of the meter data collectors and meter sensors. The network software is preferably capable of querying each meter data collector and assigning the meter data collector a physical location based on the actual physical location with reference to other collectors or "nodes."

The meter data collector gathers a usage reading from each sensor communicating with the collector and transmits the data to and receives instructions from the control center. The collector advantageously can include a power module, a controller, a telemetry module, a memory module, a multiple input connection block and a housing preferably meeting NEMA standards, as understood by those skilled in the art, to enclose the unit. In an embodiment, the multiple input connection block includes expandable or input/output ports capable of accepting either digital or analog input. In embodiments of the system, each of the sensors can be tailored to the specific type of meter to be read. For example, for a water meter, the sensor or the collector itself can be attached at the same point that the outside dial attaches. For the gas meter and steam meter, a pulse initiator can be added to the respective meter to digitize the usage. For the electric meter, a pulse board can be added.

In an embodiment of the system, the collector uses frequency hopping radio frequency (RF) electromagnetic radiation as understood by those skilled in the art. Use of an RF based network advantageously reduces data transmission cost, is flexible, and has low deployment costs. In some embodiments, the system uses low-power RF transmissions. In a medium-range embodiment, the range between collectors and the control center for associated substations can be between 500-1500 meters. In a long-range embodiment, that distance can be between 2000-6000 meters. In an embodiment, the collector is powered through a connection to the electric utility meter. Another embodiment for powering the collector includes the use of a cable having an electrical outlet interface. An alternative embodiment for powering the collector includes use of batteries.

Functionally, data is acquired from the sensor interfaced with its respective individual meter. Data is obtained by the collector, from the meter sensor, where it is temporarily stored. In an embodiment, all metering data is date and time stamped to provide an accurate record of the read. Typically and functionally this data is then forwarded directly to the control center or a substation if within range and not blocked or impeded by a physical structure or other obstacle. If the collector is not within range, the data is forwarded to another collector associated with a location closer to the control center or a substation, to an intermediate collector, to be forwarded to the control center or substation. In essence, the network structure turns every collector into an individual network node capable of transmitting its respective meter indication data from either "nodes." Thus, an embodiment of the present invention advantageously provides a self-healing network having minimal infrastructure that significantly reduces line-of-site issues whereby a physical structure may block the transmission of an individual collector. Advantageously an embodiment of the present invention also allows for scalability as the addition of a new collector at a new location that is merely tantamount to adding an additional "node" to the network. In the preferred implementation, however, the network node level between the various nodes and either the control center or a substation can be limited to 15. Advantageously the system provides for both passive and dynamic execution of a meter read. Although the control center can prompt for an additional read if greater delay accuracy is required, the collector can send a current read to the control center every 15 minutes.

The system control center further includes at least one computer, e.g., a server, including a processor to store, process, and manipulate data gathered by the collectors and transmitted to the control center. The control system correspondingly includes at least one data storage medium to provide for meter record storage and retrieval. The data storage medium is adapted to interface with software for storing and updating a database. The database includes a table(s) to assign the at least one collector physical address and assign various usage data. The usage data is compared to a temporal usage rate to formulate and store with the meter data to a record of consumption totals.

The computer system also advantageously provides various functions of the utility's control center with the meter data. Regarding a billing office, accurate timely data insures efficient monthly consumption billing on a customer-requested date. Regarding the customer service department, the collection of daily metering data enables the utility to efficiently manage final reads and switching as well as customer complaints without the expense of dispatching someone to the field to re-read the meter. Regarding the scheduling department, daily reads on all the meters in the service territory significantly improves load-forecasting accuracy. Regarding the loss management department, the collection of tamper status information on a daily basis enables quick identification and resolution of energy theft. The marketing department, daily reads allows targeting and delivery of new rates or selectable billing dates to specific customers. Daily reads on a customer that has multiple meters in multiple locations also enables delivery of aggregated billing services, or same-day billing services for all its locations. For the engineering/distribution planning department, daily data collection provides an accurate, continually updated picture of daily load that can be isolated to a specific area, enabling optimum efficiency and system planning, outage management, equipment installation, and maintenance. Additionally, frequent data collection of actual usage can be compared to estimating usage, which enables quick and efficient reconciliation and settlements between utilities, generators, ESPs, and power exchanges. For the end customer, access to daily usage information increases customer satisfaction by enabling more efficient management of energy usage and predicting energy expenditures more accurately.

Advantageously, an embodiment of the system and system software provides for the customer an increased understanding of its usage patterns. This understanding enables the proper selection of rate options, supplier choices, aggregation and balk purchasing opportunities and efficient forecasting and settlements. The system also advantageously provides for power outage notification and restoration notification. Additionally, the system provides for billing options such as selectable billing dates, selectable billing frequencies, and on-demand billing, which are not cost-efficient when using manual reading of the meter.

Advantageously, an embodiment of the system and system software provides for the utility increased distribution effectiveness including improved facilities and infrastructure planning, maintenance improvements, improved system reliability, operational efficiencies, improved customer service, outage detection, forecasting and settlements, and load balancing and planning. The system software also advantageously provides for data warehousing and data mining, historical patterns and expectations analysis, analysis for new rates structures, and services bundling such as aggregation of billing to an individual customer, outage detection monitoring, and Internet access to the data Advantageously, an embodiment of the system and system software additionally benefit the utility by providing cost savings on regular "on-cycle" meter readings, the ability to obtain more easily (e.g., instantly) final meter reads for opening/closing accounts, stream-lined high bill investigations, the ability to flag potential high consumption before consumers get a high bill, help in pinpointing system losses and detect theft in service. Additionally, the system and system software also advantageously enable more frequent reads with minimal incremental cost, enable custom billing dates, support customized rates for large customers, provide detailed consumption information to customers to provide watchdog services, like leakage monitoring, improved cash flow management due to a reduction in bill contests, improved revenue forecasting by tying detailed consumption information to production data and expected billings, enable more sophisticated rates, and reduce billing adjustments.

The system and system software of the present invention also advantageously provide for reduced capital costs due to the reduced number of vehicles necessary to physically service the meters, labor savings including the reduction in staff hours for meter reading and meter reading-related customer service, savings on vehicles and miscellaneous costs associated with meter reading, and provide for increased revenues from reducing system losses or replacing older inaccurate meters. Also, an embodiment provides the utility company with the ability for "back-end" billing and accounting software to bundle with the collector, preferably the RCU-41, and associated system software to provide a gathering, transmission, billing, collection and reporting solution.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 15A-15E are tables of an embodiment of a frequency list for transmit and receive settings according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
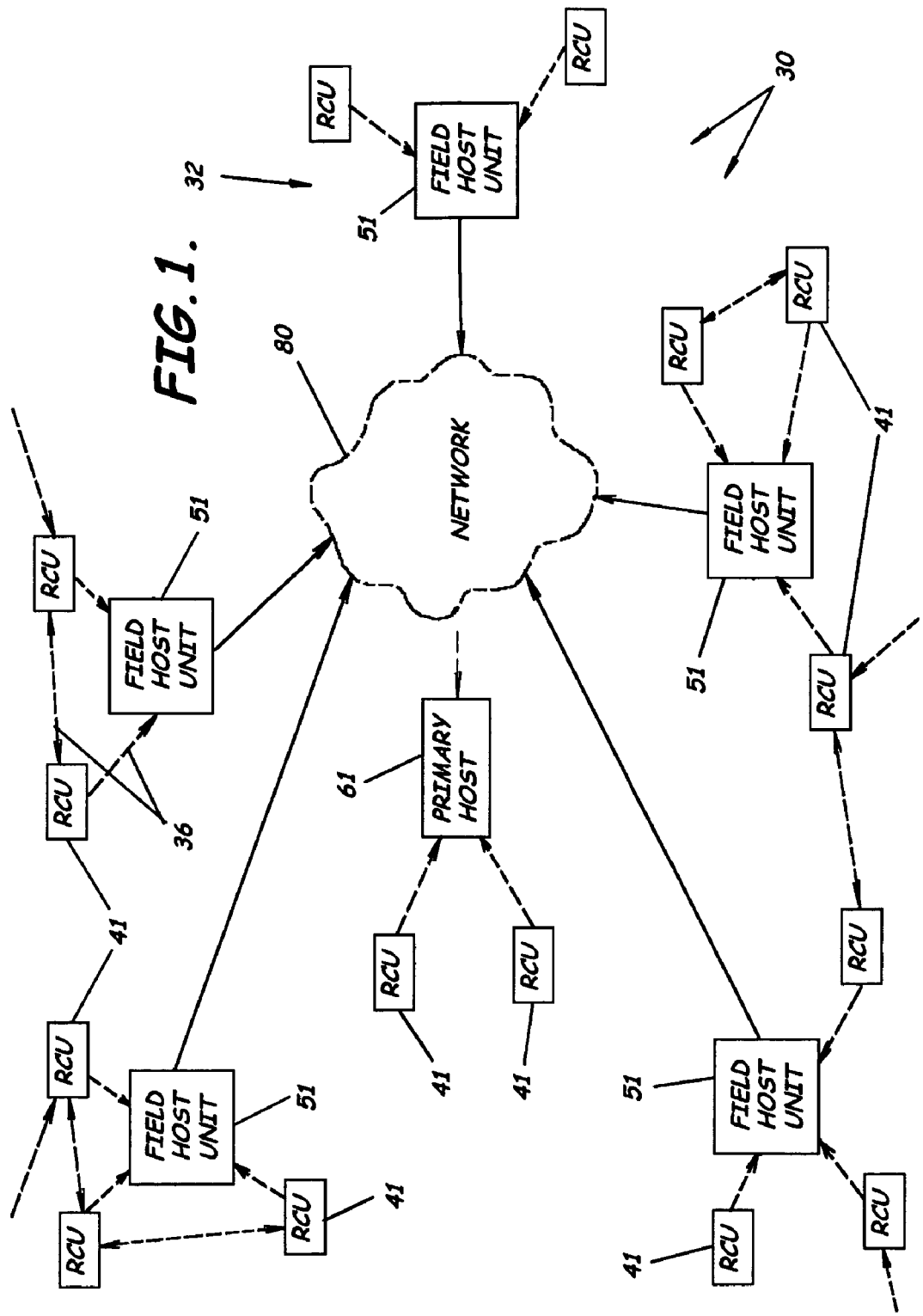
FIG. 1 is a schematic view of an automated meter reading network system according to an embodiment of the present invention.
Figure 2:
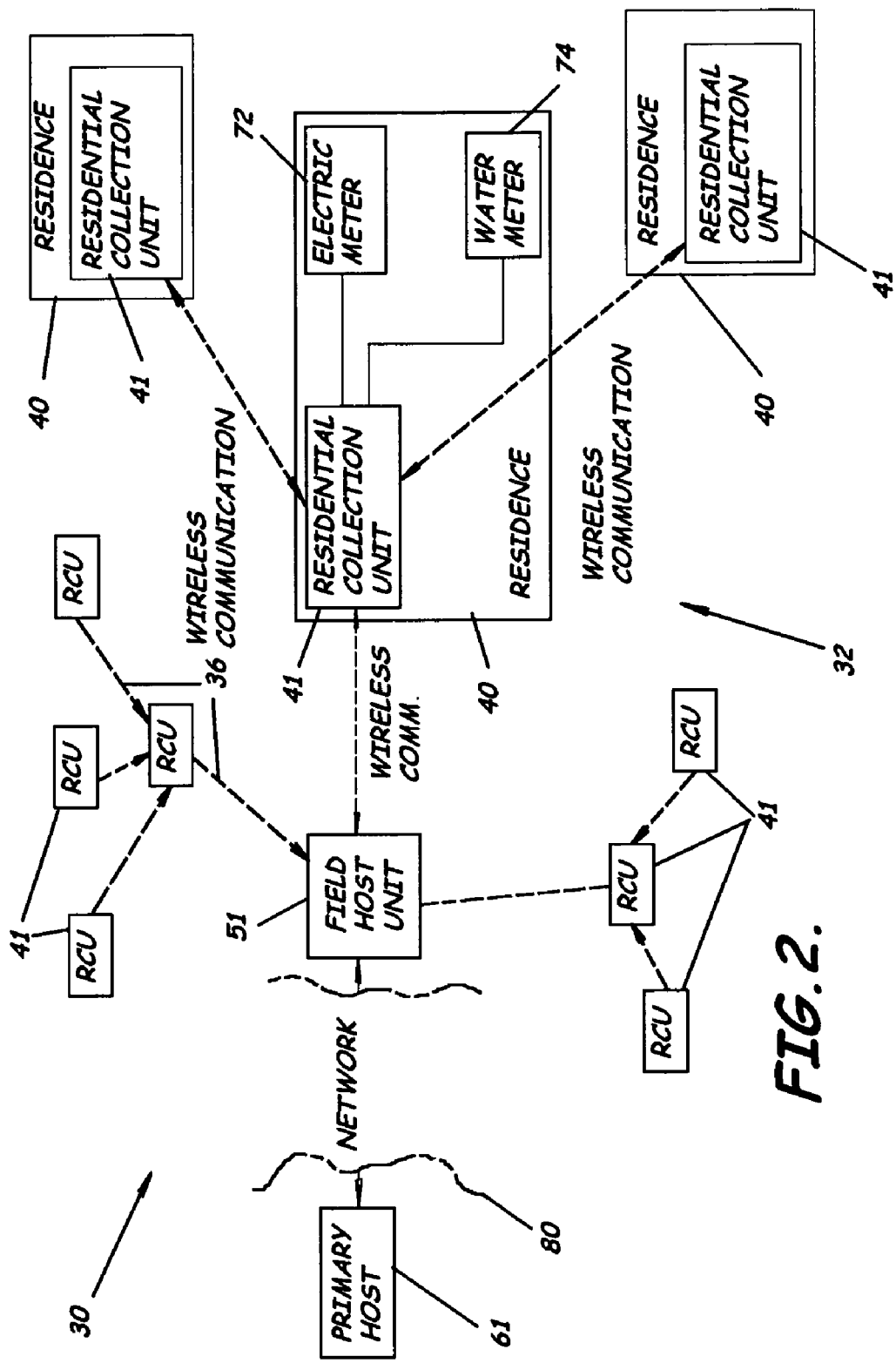
FIG. 2 is schematic view of an automated meter reading network system according to an embodiment of the present invention.

As illustrated in FIGS. 1-15E, an embodiment of the present invention provides a distributed network system 30 including a multifunction collector or controller 41, a utility meter e.g., electric 72, water 74, gas 76, or other usage, and an at least one sensor (not shown), e.g., an encoder, interfaced with the meter. The sensor is positioned in electrical communication with the collector 41 in order to provide a meter usage reading data. The system 30 also includes a remote control center 60 for gathering and processing the usage reading data. The system 30 also includes system software. Preferably, the system software has network software including a network protocol (preferably an application layer protocol, described below) for communicating over a network e.g. mesh network 32 (FIGS. 1 and 6) connected to each of a plurality of controllers 41, if desired, and at least one sensor. The network software is preferably capable of querying at least one collector 41 and assigning the at least one collector 41 a physical location based on the actual physical location with reference to the other collectors 41 or "nodes" within a network.

As shown in FIGS. 3-6, the collector unit 41 gathers a usage reading from the at least one sensor and transmits the data to and receives instructions from the remote control center 60. The multifunction collector 41 (FIG. 9) includes a power module 42, a controller 43, a telemetry module 44, a memory module 45, a multiple input connection block 46, and a housing 47 preferably meeting NEMA standards to enclose the unit. In an embodiment of the present invention, the multiple input connection block 46 advantageously can include input/output expressions modules or ports capable of accepting either digital or analog input. In embodiments of the collector, the sensor can be tailored to the specific type of meter to be read. For example, as understood by those skilled in the art, regarding a water meter 74, the sensor or the collector 41, itself, can be attached at the same point as the outside dial attaches. For the gas meter 76 and steam meter (not shown), a pulse initiator can be added to the respective meter to digitize the usage. For the electric meter 72, a pulse board can be added.

Figure 5:
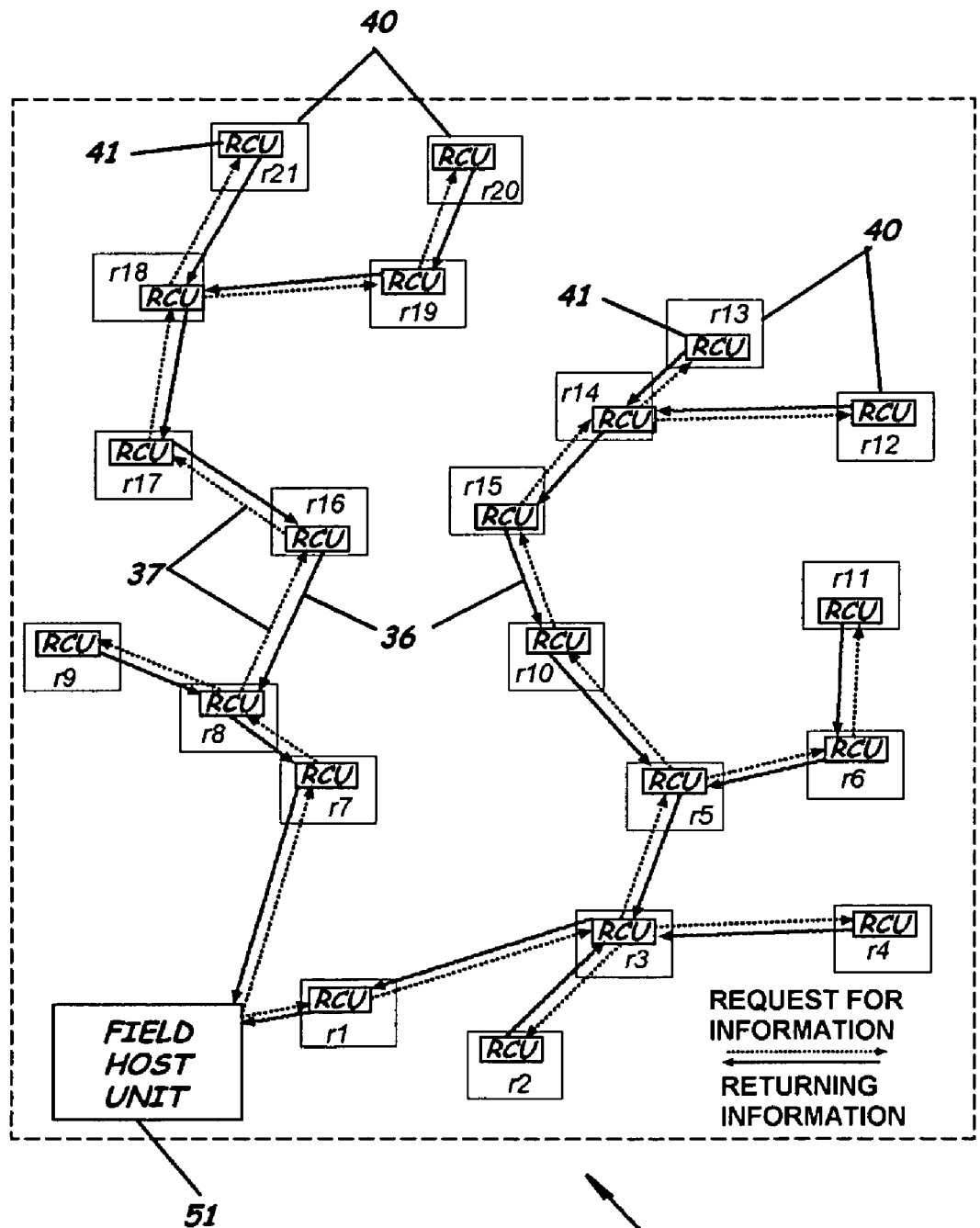
FIG. 5 is a schematic view of an automated meter reading network system according to an embodiment of the present invention.
Figure 6:
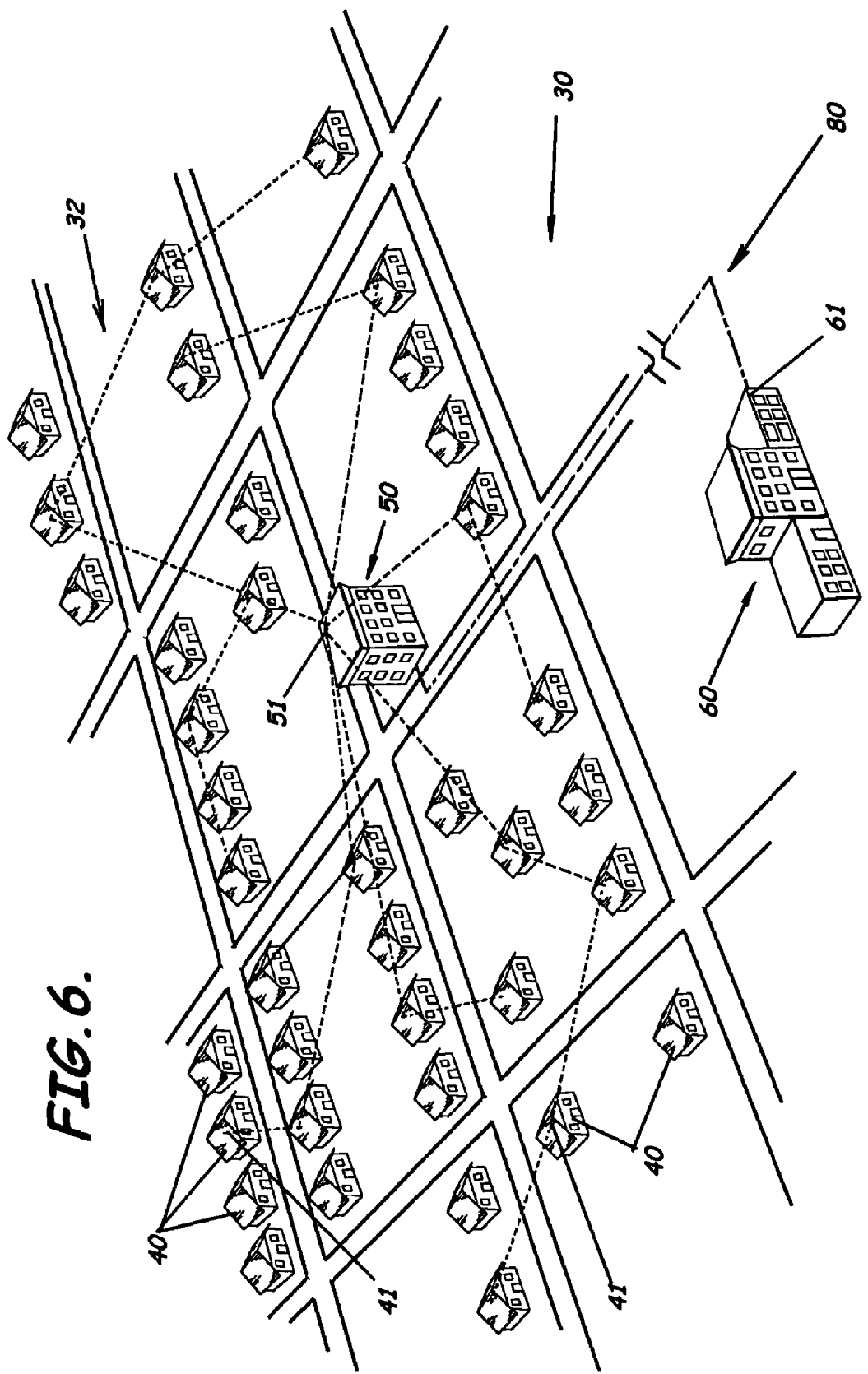
FIG. 6 is a schematic view of a plurality of meter data collectors defining a plurality of remote collection units each positioned on a separate building and in communication with a main utility center according to an embodiment of the present invention.
Figure 7:
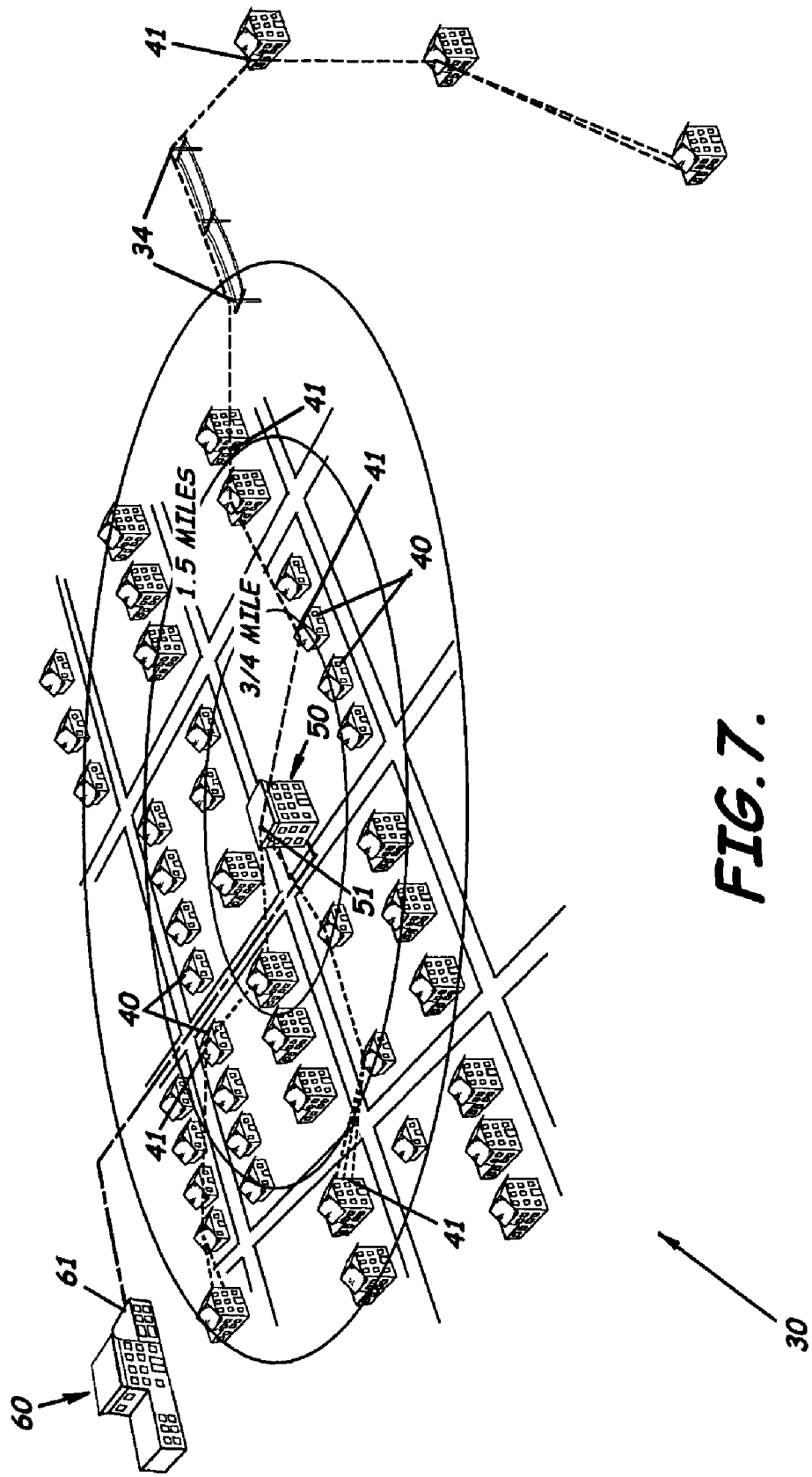
FIG. 7 is a schematic view of a plurality of meter data collectors defining a plurality of remote collection units each positioned on a separate building and in communication with a main utility center according to an embodiment of the present invention.
Figure 8:
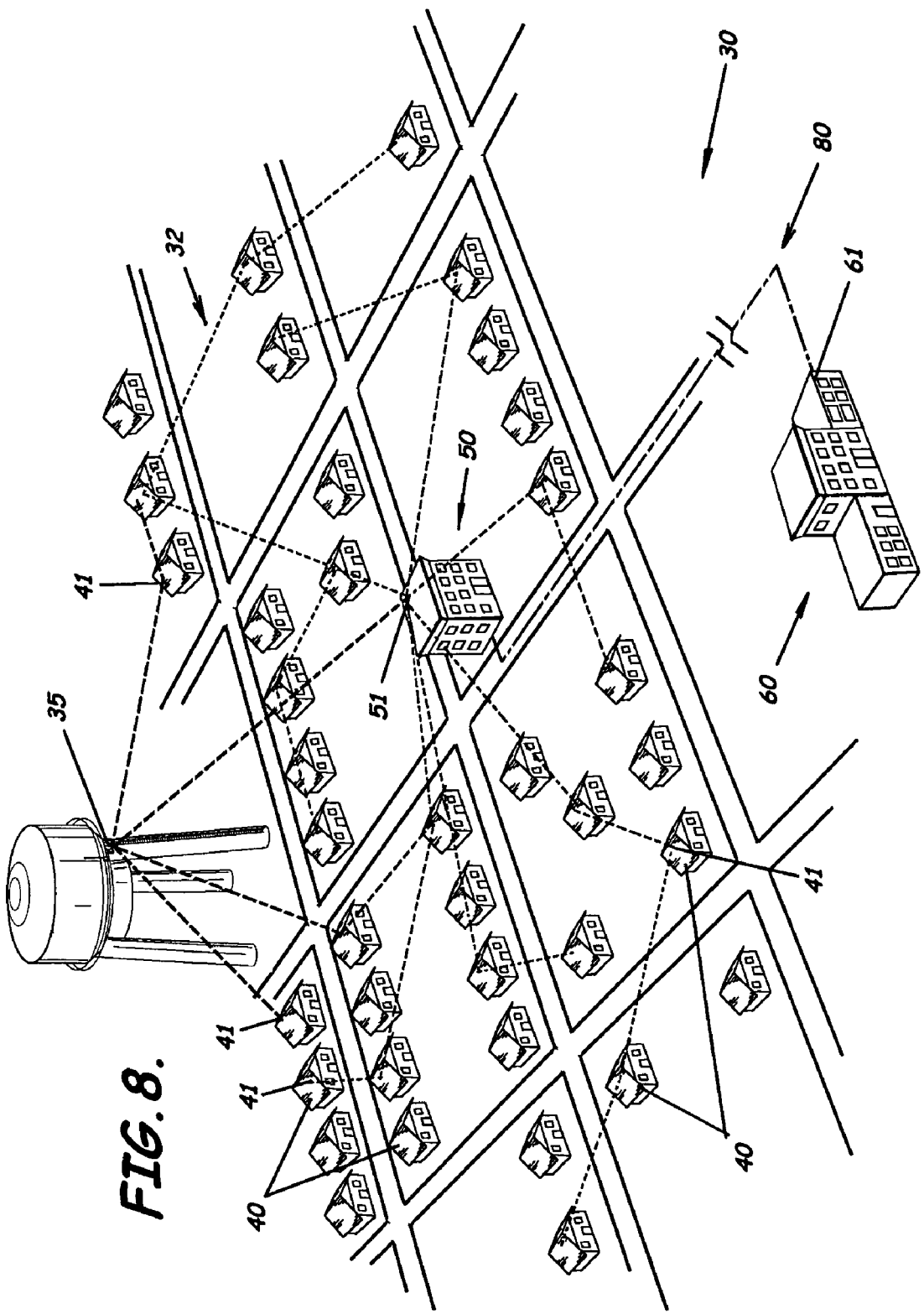
FIG. 8 is a schematic view of a plurality of meter data collectors defining a plurality of remote collection units each positioned on a separate building and in communication with a water tower having a meter data collector or repeater mounted thereto and in communication with a main utility center according to an embodiment of the present invention.

In an embodiment of a system, such as shown in FIG. 5, the system 30 uses frequency hopping radio frequency (RF) electromagnetic radiation as understood by those skilled in the art. Use of an RF based network reduces data transmission cost, is flexible, and has low deployment costs. In an embodiment of a system, the system uses low-power RF transmissions. In a medium-range embodiment, the range between collectors 41 and the control center 60 or associated substations 50 can be between 500-1500 meters. In a long-range embodiment, that distance can be between 2000-6000 meters. In an embodiment of a collector 41, the collector 41 is powered through a connection to the electric utility meter 72. Another embodiment for powering the collector 41 includes the use of a cable having an electrical outlet interface. An alternative embodiment for powering the collector 41 includes use of batteries.

Figure 3:
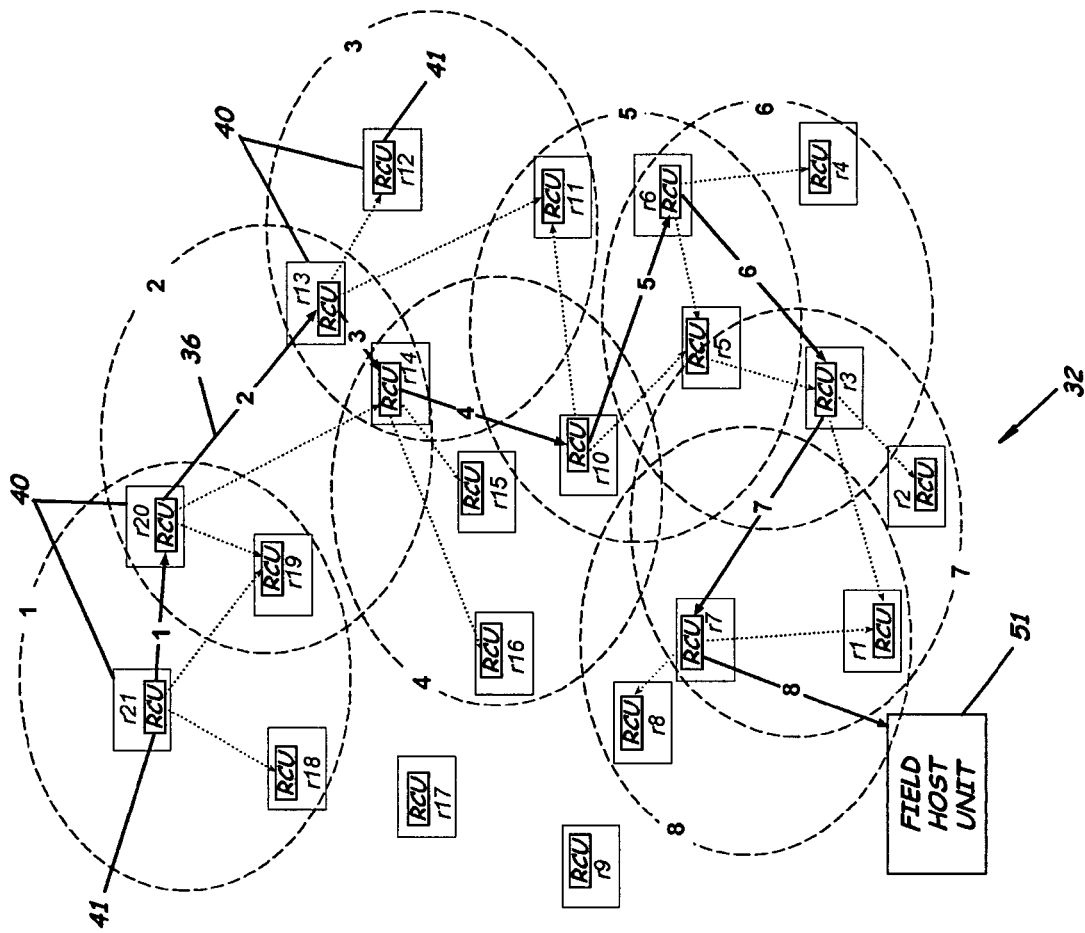
FIG. 3 is a schematic view of an automated meter reading network system according to an embodiment of the present invention.
Figure 4:
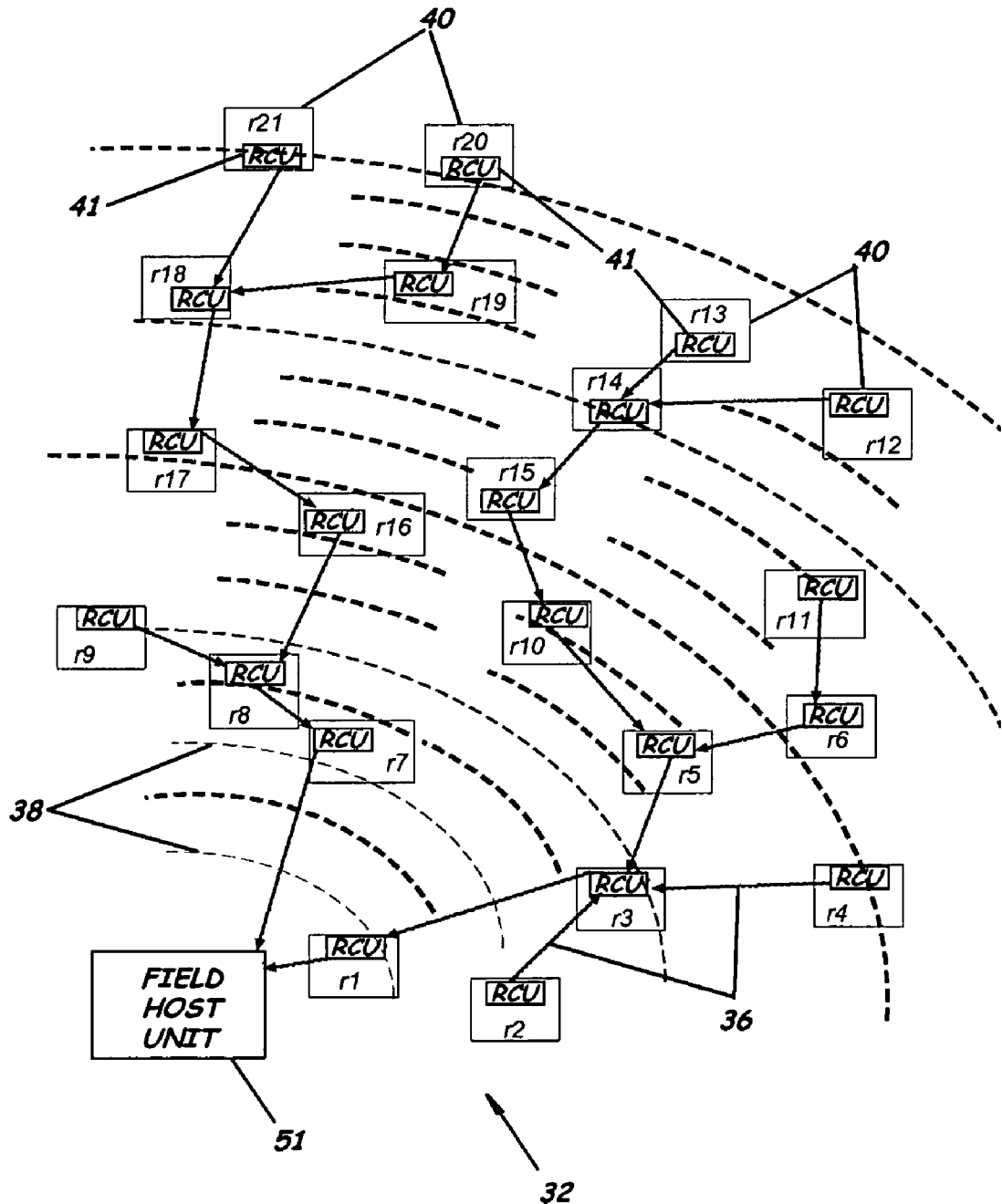
FIG. 4 is a schematic view of an automated meter reading network system according to an embodiment of the present invention.

As shown in FIGS. 3-4, functionally, data is acquired from the sensor interfaced with its respective individual meter. Data is obtained by the collector 41, from the meter sensor, where it is temporarily stored. All metering data can be date and time stamped to provide an accurate record of the read. As shown in FIG. 5, typically and functionally, this data is then forwarded directly to the remote control center 60 or a substation 50 if within range and not blocked or impeded by a physical structure or other obstacles.

The collector 41, as shown in FIG. 4 and as described herein, can have the following features:

Functional Specifications:
power source: 5VDC or 120, 240VAC transformer
tamper detection: meter removal, outage detection
operating temperatures: −40° to +85° C.
operating humidity: 5 to 95% non-condensing relative humidity
FCC Compliance: Part 15 certified
Certification: ANSI C12 Standards
Operation Specifications:
Radio Module:
Transmit and receive frequency: 902-928 MHz
CRC error checking on every message
Base Board
Discrete Inputs (4 pt.) Optically isolated 5VDC
Five I/O expansion modules
Physical Specifications
ABS plastic housing UL-94-0
10"H×10"W×5"D
Pole or wall mountable
I/O Expansion Modules
Discrete input (4 pt.) optically isolated 5VDC
Discrete input (4 pt.) optically isolated 12VDC
Discrete input (4 pt.) optically isolated 24VDC
Discrete input (2 pt.) optically isolated 5VDC
Discrete input (2 pt.) optically isolated 12VDC
Discrete input (2 pt.) optically isolated 24VDC
Discrete output (4 pt.) relay 12-280VAC 5A
Discrete output (4 pt.) relay 0-60VDC 5A
Discrete output (4 pt.) relay 0-60VDC 10A
Discrete output (2 pt.) relay 12-280VAC 5A
Discrete output (2 pt.) relay 0-60VDC 5A
Discrete output (2 pt.) relay 0-60VDC 10A
Analog input (4 pt.) 4-20 mA
Telemetry Modules
RS-232 Module, DB9, DCE
RS-485 Module
Memory Module
48K Memory module If the collector 41 is not within range, the data is forwarded to another collector 41 associated with a location closer to the control center 60 or a substation 50 meter, to an intermediate collector 34, 35 (see FIGS. 7 and 8), to be forwarded to the control center 60 or substation 50. In essence, the network structure turns every collector into an individual network node capable of transmitting its respective meter indication data and transmitting meter indication data from other "nodes." Thus, an embodiment of the present invention provides a self-healing network having minimal infrastructure that alleviates a line-of-site issue whereby a physical structure may block the transmission of an individual collector 41. An embodiment of the present invention also allows for scalability as the addition of a new collector 41 at a new location that is merely tantamount to adding an additional "node" to the network 32. In an implementation, however, the network node level between the various nodes and either the control center 60 or a substation 50 can be limited to a preselected number, such as 15. The system 30 provides for both passive and dynamic execution of a meter read. In an embodiment, the collector 41 sends a current read to the control center 60 or substation 50 every 15 minutes, although the control center 60 can prompt for an additional read if greater than 15 minutes delay accuracy is required.

The system control center 60 further includes at least one computer system 61, e.g., a server, including a processor to store, process, and manipulate data gathered by the collectors 41 and transmitted to the substation 50 or system control center 60. The computer system 61 correspondingly includes at least one data storage medium (not shown) to provide for meter record storage and retrieval. The data storage medium is adapted to interface with software for storing and updating a database (the database includes a table(s) to assign the at least one collector physical address and assign various usage data). The usage data is compared to a temporal usage rate to formulate and store with the meter data to a record of consumption totals.

The computer system 61 also provides various functions of the utility's control center 60 with the meter data. For a billing office, for example, accurate timely data insures efficient monthly consumption billing on a customer-requested date. For a customer service department, for example, the collection of daily metering data enables the utility to efficiently manage final reads and switching as well as customer complaints without the expense of dispatching someone to the field to re-read the meter. For a scheduling department, daily reads on all the meters in the service territory significantly improves load-forecasting accuracy. For a loss management department, the collection of tamper status information on a daily basis enables quick identification and resolution of energy theft. For a marketing department, for example, daily reads allow targeting and delivery of new rates or selectable billing dates to specific customers. Daily reads on a customer that has multiple meters in multiple locations also enables delivery of aggregated billing service, or same-day billing services for all its locations. For an engineering/distribution planning department, daily data collection provides an accurate, continually updated picture of daily load that can be isolated to a specific area, enabling optimum efficiency and system planning, outage management, equipment installation, and maintenance. Additionally, frequent data collection of actual usage can be compared to estimating usage, which enables quick and efficient reconciliation and settlements between utilities, generators, energy service providers (ESPs), and power exchanges. For an end customer, access to daily usage information increases customer satisfaction by enabling more efficient management of energy usage and predicting energy expenditures more accurately.

An embodiment of the system 30 and system software provides for a customer an increased understanding of its usage patterns. This understanding enables the proper selection of rate options, supplier choices, aggregation and bulk purchasing opportunities and efficient forecasting and settlements. The system 30 also advantageously provides for power outage notification and restoration notification. Additionally, the system 30 provides for billing options such as selectable billing dates, selectable billing frequencies, and on-demand billing, which are not cost-efficient when using manual reading of the meter.

An embodiment of the system 30 and system software provides for the utility increased distribution effectiveness including improved facilities and infrastructure planning, maintenance improvements, improved system reliability, operational efficiencies, improved customer service, outage detection, forecasting and settlements, and load balancing and planning. The system software also advantageously provides for data warehousing and data mining, historical patterns and expectations analysis, analysis for new rates structures, and services bundling such as aggregation of billing to an individual customer, outage detection monitoring, and Internet access to the data.

An embodiment of the system 30 and system software additionally benefit the utility by providing cost savings on regular "on-cycle" meter readings, the ability to obtain more easily (instantly) final meter reads for opening/closing accounts, streamlined high bill investigations, the ability to flag potential high consumption before consumers get a high bill, help in pinpointing system losses and detect theft of service. Additionally, the system 30 and system software also advantageously enable more frequent reads with minimal incremental cost, enable custom billing dates, support customized rates for large customers, provide detailed consumption information to customers to provide watchdog services, like leakage monitoring, improved cash flow management due to a reduction in bill contests, improved revenue forecasting by tying detailed consumption information to production data and expected billings, enable more sophisticated rates, and reduce billing adjustments.

The system 30 and system software of the present invention also provide for reduced capital costs due to the reduced number of vehicles necessary to physically service the meters, labor savings including the reduction in staff hours for meter reading and meter reading-related customer service, savings on vehicles and miscellaneous costs associated with meter reading, and provide for increased revenues from reducing system losses or replacing older inaccurate meters. Also, an embodiment a system 30 provides the utility company with the ability for "back-end" billing and accounting software to bundle with the collector and associated system software to provide a gathering, transmission, billing, collection and reporting solution.

In the preferred embodiment of the present invention, the network software associated with a server 61 and associated with each collector 41 in the system 30 can include a preselected protocol, such as an application layer protocol positioned at level 7 of an OSI model as understood by those skilled in the art, which provides communication between devices connected on different types of buses or networks. This software, for example, can allow collectors to communicate with each other and a server or substation. The preselected protocol can be a request/reply protocol and offers services specified by message type.

A preselected protocol message packet is built by a master application that initiates a preselected transaction. The message type indicates to the slave application what kind of action to perform. The size of the preselected protocol message packet is device dependent and can have a maximum of 256 bytes. In an embodiment of the present invention, the preselected protocol uses a focused representation for addresses and data items. This focus, for example, can occur such as when a numerical quantity larger than a single byte is transmitted, the most significant byte is sent first.

The preselected protocol includes a non-routed protocol frame and a routed protocol frame. In an embodiment, the routed protocol frame includes the following elements: a Start of Message (SOT), Message Type (MT), Message Sequence Number (MSN), Message Length (ML), Message Date Time (MDT), Routing Source Node Information (RSN), Routing Source Node Identification (RSID), Routing Subnet Mask (RSM), Routing Destination Node Identification (RDID), Routing Gateway Information (RGI) or Routing Gateway Number (RGN), Routing Gateway Index (RGI), Routing Gateway Node Identification (RGID), Payload Data (PD), and Cyclical Redundancy Check (CRC).

| SOT | MT | MSN | ML | MDT | RSN | RSID | RSM | RDID | RGI | RGID | PD | CRC |
|-----|----|----|----|-----|-----|------|-----|------|-----|------|----|----|

The non-routed protocol frame is nearly identical except for does not include the RGID.

| SOT | MT | MSN | ML | MDT | RSN | RSID | RSM | RDID | RGI | PD | CRC |
|-----|----|----|----|-----|-----|------|-----|------|-----|----|----|

The following have an example of the Protocol Frame Element Definitions:

| Element | Description | Length | Range | Comments |
|---------|-------------|--------|-------|----------|
| SOT | Start of Transmission | 1 byte | [0xEE] | Constant Value |
| MT | Message Type | 1 byte | | See below |
| MSN | Message Sequence | 1 byte | [0x00-0xFF] | Message originator connection depen- |

-continued

| Element | Description | Length | Range | Comments |
|---------|-------------|--------|-------|----------|
| | Number | | | dent incremental message identification number. |
| ML | Message Length | 1 byte | [0x00-0xFF] | Device Dependent |
| MDT | Message Date Time | 4 bytes | [0x00000000-0xFFFFFFFF] | Message Date Time Stamp |
| RSN | Routing Source Node Information | 1 byte | | Reserved for future use. |
| RSID | Routing Source Node Identification | 4 bytes | [0x00000000-0xFFFFFFFF] | Message originator unique unsigned long identification number. |
| RSM | Routing Subnet Mask | 4 bytes | [0x00000000-0xFFFFFFFF] | Message filtering mask |
| RDID | Routing Destination Node Identification | 4 bytes | [0x00000000-0xFFFFFFFF] | Message destination unique unsigned long identification number. |
| RGI | Routing Gateway Information | 1 byte | [0x00-0xFF] | High nibble RGN. Low nibble RGI. |
| RGN | Routing Gateway Number | 4 bits | [0x00-0x0F] | Number of Routing Gateways required transmitting message from source node to destination node. |
| RGI | Routing Gateway Index | 4 bits | [0x00-0x0F] | Current Routing Gateway index while transmitting message from source node to destination node. |
| RGID | Routing Gateway Node Identifications | 4 bytes * RGN | | Routing Source Identification Number of each Routing Gateway along path from source node to destination node. |
| PD | Payload Data | | | Payload Data is dependent upon message type. |
| CRC | Cyclical Redundancy Check | 2 bytes | [0x00-0xFF] | CRC-16 Polynomial Mask 0x1021 |

According to an embodiment, the preselected protocol can support three levels of message security. Each security level is validated by an up to eight-byte security password. Each security level password byte may be any ASCII character. Each security level password is stored relevant to the routing source identification number. For the purpose of CRC calculation only, the security level password is appended to the message.

In this embodiment, the preselected protocol frame Message Type element is a bit-significant field and includes the following elements: Security Level (SL), Message Type (MT), Read or Write Direction Flag (R#/W), and Acknowledgement Flags (ACK).

| | SL | MT | R#/W | ACK |
|--|----|----|------|-----|

The following are an example of Message Type Byte Element Definitions:

| Element | Description | Length | Range | Comments |
|---------|-------------|--------|-------|----------|
| SL | Security Level | 2 bits | [0x00-0x03] | 0x00: None<br>0x01: Security Level 1<br>0x02: Security Level 2<br>0x03: Security Level 3 |
| MT | Message Type | 3 bits | [0x00-0x07] | See section 3.2: Message Type Definition |
| R#/W | Read or Write Direction Flag | 1 bit | [0x00-0x01] | 0x00: Read<br>0x01: Write |
| ACK | Acknowledgement Flags | 2 bits | [0x00-0x03] | 0x00: Send/Negative Acknowledge<br>0x01: Acknowledge Send<br>0x02: Response<br>0x03: Acknowledge Response |

In an embodiment, when a master application directly addresses a slave application (non-routing), the slave application processes the message type specified action and responds by setting the acknowledge binary code to 'Response' (0x02) within the message type frame element. When a master application addresses a slave application via routing, the first gateway node will route the message to the next gateway node and respond to the master application by setting the acknowledge binary code to 'Ack Send' (0x01) within the message type frame element. When the destination node receives the routed message, the destination node processes the message type specified action and responds by setting the acknowledge binary code to 'Response' (0x02) within the message type frame element. If the message fails to respond from the destination node, the gateway node of last transmission will originate and route the return message to the source node by setting the acknowledge binary code to 'Send/Negative Acknowledge' (0x00) within the message type frame element.

In an embodiment, the following preselected protocol message types, for example, can be supported:

| Message Type | Message Type Description | Read Supported | Write Supported | Security Level |
|--------------|--------------------------|----------------|-----------------|----------------|
| 0x00 | Control | Yes | Yes | 0x00-0x03 |
| 0x01 | Control Route | Yes | Yes | 0x00-0x03 |
| 0x02 | Control Broadcast | Yes | Yes | 0x00-0x03 |
| 0x03 | Reserved | — | — | — |
| 0x04 | Configuration | Yes | Yes | 0x02-0x03 |
| 0x05 | Reserved | — | — | — |
| 0x06 | $I^2C$ | Yes | Yes | 0x03 |
| 0x07 | Diagnostic | Yes | No | 0x03 |

The preselected protocol frame element includes a payload data section. The payload data section of the message packet sent from master application to slave application contains information that the master application uses to take the action defined by the message type. The payload data section of the message packet may be nonexistent (of zero length) in certain kinds of requests. In such case the slave application does not require any additional information. The message type in this instance specifies the action. The following details the payload data requirements for each of the supported message types. Data registers are referenced by control type and control index. For example: To reference the first analog input point the control type would be 0x02 and the control index would be 0x00.

Examples of Control Data Types are as follows:

| Control Data Type | Control Description | Data Type | Data Range |
|---|---|---|---|
| 0x00 | Discrete Input | Byte | [0x00-0x01] |
| 0x01 | Discrete Output | Byte | [0x00-0x01] |
| 0x02 | Analog Input | Unsigned Integer | [0x00-0xFFFF] |
| 0x03 | Analog Output | Unsigned Integer | [0x00-0xFFFF] |
| 0x04 | Date Time | See below | |
| 0x05 | Counter | Unsigned Log | [0x00-0xFFFFFFFF] |
| 0x06 | Reserved | | |
| 0x08 | Reserved | | |
| 0x09 | Reserved | | |
| 0x10 | History Record | See below | |
| 0x11 | Event Record | See below | |

Discrete Control Data Types 0x00 and 0x01 are packed into bytes. As understood by those skilled in the art, a master query must divide the requested point index by 0x08 to obtain the proper control data index. For example: A master query for the status of discrete input 0x09 must request control data type 0x00 and index 0x01. The slave response data value bit 1 will contain the status of discrete input 0x09.

The most significant bit of the Control Data Type is an exception response flag. For example: if a control message requests an index that is not supported by the slave device, the slave device response will echo the requested data type and set the most significant bit. The byte following the control index will be a single byte Control exception code regardless of data type. Control exception codes are defined below. The Control Date Time data type can be defined as the number of seconds from the host server reference date and time. The Control History Record data type is defined as the following:

| Offset | Description | Control Data Type | Data Type | Comment |
|---|---|---|---|---|
| 0x00 | Data Time Stamp | Control Date Time | Unsigned Long | Control date time stamp of stored data value |
| 0x04 | Data Value Type | Control Data Type | Byte | Control data type of stored data value |
| 0x05 | Data Value | Control Data Value | — | Control Data value |

The Control Event Record data type can be defined as the following:

| Offset | Description | Control Data Type | Data Type | Comment |
|---|---|---|---|---|
| 0x00 | Data Time Stamp | Control Date Time | Unsigned Long | Control date time stamp of stored data value |
| 0x04 | Event Type Code | Event Type | Byte | Event Type Code Reserved Always 0x00. |
| 0x05 | Data Value Type | Control Data Type | Byte | Control data type of stored data value |
| 0x06 | Data Old Value | Control Data Old Value | — | Control data old value |
| — | Data New Value | Control Data New Value | — | Control data new value |

The Control exception codes can include the following:

| Code | Name | Meaning |
|---|---|---|
| | Control Exception Codes | |
| 0x00 | ILLEGAL FUNCTION | The requested operation to perform on the referenced data type is not supported by the end device or not permitted due to security level access. |
| 0x01 | ILLEGAL DATA TYPE | The data type received in the query is not an allowable type for the slave device. |
| 0x02 | ILLEGAL DATA INDEX | The data index received in the query is not an allowable index for the slave device. |
| 0x03 | ILLEGAL DATA VALUE | The value contained in the query data field is not an allowable value for the slave device. |
| 0x04 | SLAVE DEVICE BUSY | The slave device is engaged in processing a long-duration program command. The master device should retransmit the message later when the slave device is free. |
| 0x05 | SLAVE DEVICE FAILURE | An unrecoverable error occurred while the slave device was attempting to perform the requested action. |

Figure 13:
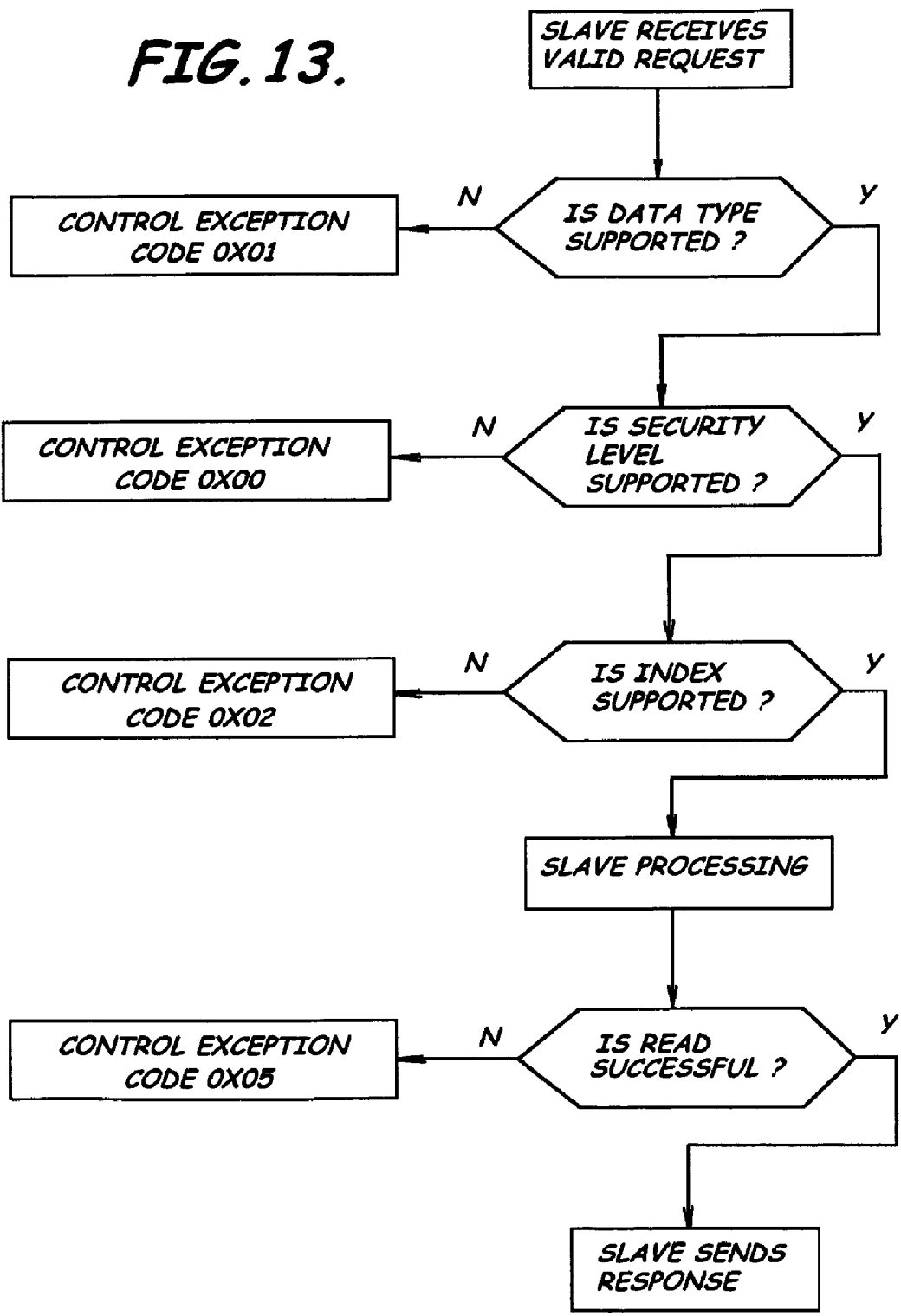
FIG. 13 is flow diagram of a control read state of a collector according to an embodiment of the present invention.
Figure 14:
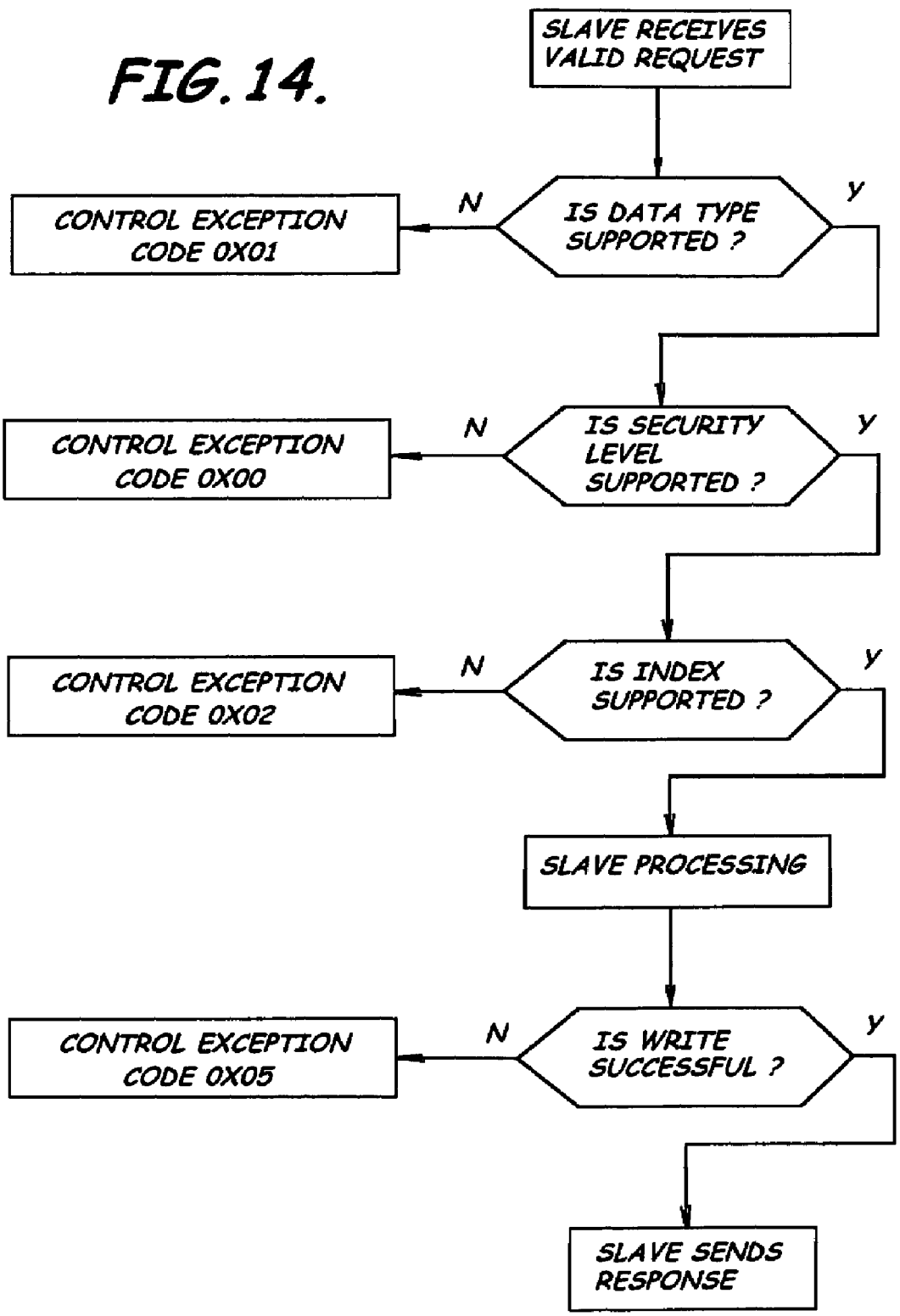
FIG. 14 is a flow diagram of the control write state of a collector according to an embodiment of the present invention.

As shown in FIGS. 13-14, in an embodiment, the control message type includes a control read and a control write message type. The control read message type is used to read data registers from a slave device. Read access to data registers is dependent upon security level as defined as follows:

| Control Data Type | Control Description | Data Type | Security Levels |
|---|---|---|---|
| 0x00 | Discrete Input | Byte | 0x00-0x03 |
| 0x01 | Discrete Output | Byte | 0x00-0x03 |
| 0x02 | Analog Input | Unsigned Integer | 0x00-0x03 |
| 0x03 | Analog Output | Unsigned Integer | 0x00-0x03 |
| 0x04 | Date Time | See above | 0x02-0x03 |
| 0x05 | Counter | Unsigned Long | 0x01-0x03 |
| 0x06 | Reserved | — | — |
| 0x07 | Reserved | — | — |
| 0x08 | Reserved | — | — |
| 0x09 | History Record | See above | 0x01-0x03 |
| 0x10 | Event Record | See above | 0x01-0x03 |

In an embodiment, the payload data element of the control read message frame includes a master and a slave. The master can include the elements of:

| COUNT$_N$ | CT$_1$ | CI$_1$ | ... | CT$_N$ | CI$_N$ |
|---|---|---|---|---|---| where for each requested data value N, the control read message from the master must designate the control data type and control data index.

The slave can include the elements of:

| COUNT$_N$ | CT$_1$ | CI$_1$ | CV$_1$ | ... | CT$_N$ | CI$_N$ | CV$_N$ |
|---|---|---|---|---|---|---|---| where for each requested data value N, the control read message response from the slave must designate the control data type, control data index, and control data value.

| Element | Description | Length | Range | Comment |
|---|---|---|---|---|
| COUNT$_N$ | Point Quantity | 1 byte | [0x00-0xFF] | Slave Device Message Length Dependent |
| CT$_I$ | Control Data Type | 1 byte | | See above |
| CI$_I$ | Control Data Index | 1 byte | [0x00-0xFF] | Slave Device Dependent |
| CV$_I$ | Control Data Value | | | See above |

In this embodiment, the control write message type is used to write values to data registers in a slave device. Write access to data registers is dependent upon security level as defined as follows:

| Control Data Type | Control Description | Data Type | Security Levels |
|---|---|---|---|
| 0x00 | Discrete Input | Byte | Exception Code 0x00 |
| 0x01 | Discrete Output | Byte | 0x01-0x03 |
| 0x02 | Analog Input | Unsigned Integer | Exception Code 0x00 |
| 0x03 | Analog Output | Unsigned Integer | 0x01-0x03 |
| 0x04 | Date Time | See Control Date Time structure definition | 0x02-0x03 |
| 0x05 | Counter | Unsigned Long | 0x02-0x03 |
| 0x06 | Reserved | | |
| 0x07 | Reserved | | |
| 0x08 | Reserved | | |
| 0x09 | History Record | See Control History Record structure definition | Exception Code 0x00 |
| 0x10 | Event Record | See Control Event Record structure definition | Exception Code 0x00 |

In an embodiment, the payload data element of the control write message frame includes a master and a slave. The master can include the elements of:

| COUNT$_N$ | CT$_1$ | CI$_1$ | CV$_1$ | ... | CT$_N$ | CI$_N$ | CV$_1$ |
|---|---|---|---|---|---|---|---| where for each requested data value N, the control write message from the master must designate the control data type, control data index, and control data value.

The slave can include the elements of:

| COUNT$_N$ | CT$_1$ | CI$_1$ | ... | CT$_N$ | CI$_N$ |
|---|---|---|---|---|---| where for each requested data value N, the control write message response from the slave must acknowledge the control data type and control data index.

| Element | Description | Length | Range | Comments |
|---|---|---|---|---|
| COUNT$_N$ | Point Quantity | 1 byte | [0x00-0xFF] | Slave Device Message Length Dependent |
| CT$_I$ | Control Data Type | 1 byte | | See above: Control Data Types |
| CI$_I$ | Control Data Index | 1 byte | [0x00-0xFF] | Slave Device Dependent |
| CV$_I$ | Control Data Value | • | | See above: Control Data Types |

This embodiment includes a Control Route message type, defined for increased efficiency of network bandwidth by allowing the collection of intermediate routing gateway data while acquiring end node data. Data types, exception codes, and security codes for the Control Route message types are defined with the Control message type.

The Control Route message type includes a Control Route Read and a Control Route Write message type. The control route read message type is used to read data registers from a slave device and each routing gateway node.

The payload data element of the control route read message frame also includes a master and a slave. The master can include the elements of:

| COUNT$_N$ | CT$_1$ | CI$_1$ | ... | CT$_N$ | CI$_N$ |
|---|---|---|---|---|---| where for each requested data value N, the control read message from the master must designate the control data type and control data index.

The slave can include the elements of:

| COUNT$_N$*$_X$ | CT$_1$ | CI$_1$ | CV$_1$ | ... | CT$_{11}$ | CI$_{11}$ | CV$_{11}$ | ... | CT$_{NX}$ | CI$_{NX}$ | CV$_{NX}$ |
|---|---|---|---|---|---|---|---|---|---|---|---| where for each requested data value N, the control read message response from the slave (and each routing gateway node X) must designate the control data type, control data index, and control data value.

| Element | Description | Length | Range | Comments |
|---|---|---|---|---|
| $COUNT_N$ | Point Quantity | 1 byte | [0x00-0Xff] | Device Message Length Dependent |
| $CT_I$ | Control Data Type | 1 byte | | See above: Control Data Types |
| $CI_{IX}$ | Control Data Type | 1 byte | | Control Data Type for routing gateway node X |
| $CI_I$ | Control Data Index | 1 byte | [0x00-0xFF] | Device Dependent |
| $CV_I$ | Control Data Value | | | See above: Control Data Types |

The control route write message type is used to write data registers from a slave device and each routing gateway node. The payload data element of the control route write message frame includes a master and a slave. The master can include the elements of:

| $COUNT_N$ | $CT_1$ | $CI_1$ | $CV_1$ | ... | $CT_N$ | $CI_N$ | $CV_1$ |
|---|---|---|---|---|---|---|---| where for each requested data value N, the control route write message from the master must designate the control data type, control data index, and control data value.

The slave can include the elements of:

| $COUNT_N{}^*{}_{(X+1)}$ | $CT_1$ | $CI_1$ | ... | $CT_{11}$ | $CI_{11}$ | ... | $CT_{N1}$ | $CI_{N1}$ | $CT_{1X}$ | $CI_{1X}$ | ... | $CT_{NX}$ | $CI_{NX}$ |
|---|---|---|---|---|---|---|---|---|---|---|---|---|---| where for each requested data value N the control write message response from the slave (and each routing gateway node X) must acknowledge the control data type and control data index.

| Element | Description | Length | Range | Comments |
|---|---|---|---|---|
| $COUNT_N$ | Point Quantity | 1 byte | [0x00-0xFF] | Device Message Length Dependent |
| $CT_I$ | Control Data Type | 1 byte | | See section 4.1.1: Control Data Types |
| $CI_{IX}$ | Control Data Type | 1 byte | | Control Data Type for routing gateway node X |
| $CI_I$ | Control Data Index | 1 byte | [0x00-0xFF] | Device Dependent |
| $CV_I$ | Control Data Value | | | See section 4.1.1: Control Data Types |

An embodiment can include a Control Broadcast message type. The Control Broadcast Message Type is defined for increased efficiency of network bandwidth by allowing the collection/control of multiple end node devices. Data types, exception codes, and security codes for the Control Route message types are defined with the Control message type.

The Control Broadcast command may be routed through the network and will be transmitted from the device identified by the routing destination identification number field. When the device identified by the routing destination identification number transmits the control broadcast message, the device will use a routing destination identification number of 0x00000000. If the routing destination identification number is unknown, a routing destination identification number of 0x00000000 may be used if the routing gateway information field is 0x00.

The Control Broadcast Message Type includes a Control Broadcast Read Message Type and a Control Broadcast Write Message Type. The Control Broadcast Read Message type is used to read data registers from multiple slave devices. Slave nodes to respond to specified action are determined by the routing subnet mask.

The payload data element of the control broadcast read message frame includes a master and a slave. The master can include the elements of:

| $COUNT_N$ | $CT_1$ | $CI_1$ | ... | $CT_N$ | $CI_N$ |
|---|---|---|---|---|---| where for each requested data value N, the control broadcast message from the master must designate the control data type and control data index.

The slave can include the elements of:

| $COUNT_N$ | $CT_1$ | $CI_1$ | $CV_1$ | ... | $CT_N$ | $CI_N$ | $CV_N$ |
|---|---|---|---|---|---|---|---| where for each requested data value N, the control broadcast message response from each slave must designate the control data type, control data index, and control data value.

The control broadcast write message type is used to write values to data registers in multiple slave device nodes. Slave nodes to perform specified action are determined by the routing subnet mask.

The payload data element of the control broadcast write message frame includes a master and a slave. The master can include the elements of:

| $COUNT_N$ | $CT_1$ | $CI_1$ | $CV_1$ | ... | $CT_N$ | $CI_N$ | $CV_N$ |
|---|---|---|---|---|---|---|---| where for each requested data value N, the control broadcast write message from the master must designate the control data type, control data index, and control data value.

The slave can include the elements of:

| $COUNT_N$ | $CT_1$ | $CI_1$ | ... | $CT_N$ | $CI_N$ |
|---|---|---|---|---|---| where for each requested data value N the control broadcast write message response from the slave (primary only) must acknowledge the control data type and control data index.

Embodiments of the present invention also provide an automated meter reading network system 30 having a plurality of utility meters each one positioned remote from the other ones of the plurality of utility meters, e.g., electric 72, water 74, gas 76, or other usage (FIG. 9), a plurality of sensors (not shown) interfaced with each of the plurality of meters so that at least one of the plurality of sensors interfaces with and is positioned adjacent at least one of the plurality of meters to, thereby sense utility usage data from each of the plurality of meters, a communication network 32, a plurality of meter data collectors 41 positioned to collect utility usage data from each of the plurality of sensors so that at least one of the plurality of meter data collectors 41 is positioned adjacent at least one of the plurality of utility meters and in communication with at least one of the plurality of sensors which interfaces with the at least one of the plurality of utility meters, the plurality of meter data collectors 41 also being adapted to be positioned in communication with each other through the communication network 32 so that each of the plurality of meter data collectors 41 defines a communication node 41 in the communication network 32 and the plurality of meter data collectors 41 define a plurality of communication nodes 41 in the network 32, and a host computer (e.g. primary host computer 61) positioned remote from the plurality of meter data collectors 41 at a utility central station 60 and in communication with each of the plurality of communication nodes 41 in the communication network 32 so that each one of the plurality of communication nodes 41 are adapted to communicate with other ones of the plurality of communication nodes 41 in the communication network 32 to thereby reduce line-of-site communication problems between each of the plurality of communication nodes 41 and the host computer 61.

Additionally, the system 30 can also have each of the plurality of meter data collectors 41 including a collector transceiver 44 positioned to transmit data to the host computer 61 and to other ones of the plurality of meter data collectors 41 through the communication network 32 and to receive data from the computer 61 and from the other ones of the plurality of meter data collectors 41 through the communication network 32, and a collector controller 43 positioned to control collecting of utility usage data and the transmitting and receiving of data to and from the collector transceiver 44. The host computer 61, for example, can include a host transceiver (not shown) positioned to transmit data to and receive data from each of the plurality of communication nodes 41 and a host controller (not shown) positioned to control collecting of utility usage data from each of the plurality of communication nodes 41, transmitting data to each of the plurality of communication nodes 41 through the host transceiver, and receiving data from each of the plurality of communication nodes 41 through the host transceiver. Each collector controller 43 of the plurality of meter data collectors 41 and the host controller can include controller software associated with the respective controller and having a network data communication protocol. The network data communication protocol includes a preselected application layer, and the communication network 32 comprises a radio frequency communication network. The radio frequency communication network has a frequency acceptable to the Federal Communication Commission or other regulatory agency as desired. For example, the frequency can be in the range of 850-1000 mega-hertz or 2.4-5.8 giga-hertz. The frequency can advantageously continuously change between a plurality of different preselected frequencies to thereby define frequency hopping. The controller software of the host controller initiates polling of the plurality of communication nodes 41 through the frequency hopping within the communications network 32, and each of the plurality of communication nodes 41 responds to the polling by the host computer 61, through the frequency hopping within the communications network 32. The network software (not shown) includes an autosequencer to initiate polling of the plurality of communication nodes 41 whereby each of the plurality of communication nodes 41 is individually attempted to be polled by the host computer 61 to determine a strength of communication signal between the host computer 61 and each of the plurality of communication nodes 41. Each of the plurality of communication nodes 41 also attempt to communicate with each other, responsive to the autosequencer, to determine a strength of communication signal between one of the plurality of communications nodes 41 and another one of the plurality of communication nodes 41, and the autosequencer further determines a communication sequence to each of the plurality of communication nodes 41 responsive to the strength of communication signal between the host computer and each of the plurality of communication nodes and responsive to the strength of communication signal between each of the plurality of communication nodes 41 to define a preferred communication sequence path to each of the plurality of communication nodes 41 from the host computer 61. The autosequencer updates the preferred communication sequence path to allow the preferred communication sequence path to vary over time.

The plurality of meter data collectors 41, for example, can include a first meter data collector 41, a second meter data collector 41 in communication with the first meter data collector 41, and a third meter data collector 41 in communication with one or both of the first and second meter data collectors 41. The first meter data collector 41 can be positioned remote from the host computer 61, to thereby have a greater signal strength than the second meter data collector 41 and the third meter data collector 41. The second meter data collector 41 can be positioned remote from host computer 61, to thereby have a greater signal strength than the third meter data collector 41, and the network software further includes a raking router (not shown) to collect meter usage data from the first meter data collector 41 responsive to polling received from the host computer 61 and to rakingly collect data from each of the second and third meter data collectors 41 responsive to the polling so that meter usage data is collected from each of the first, second, and third meter data collectors 41 responsive to polling the first meter data collector 41 and routed to the host computer 61.

Figure 9:
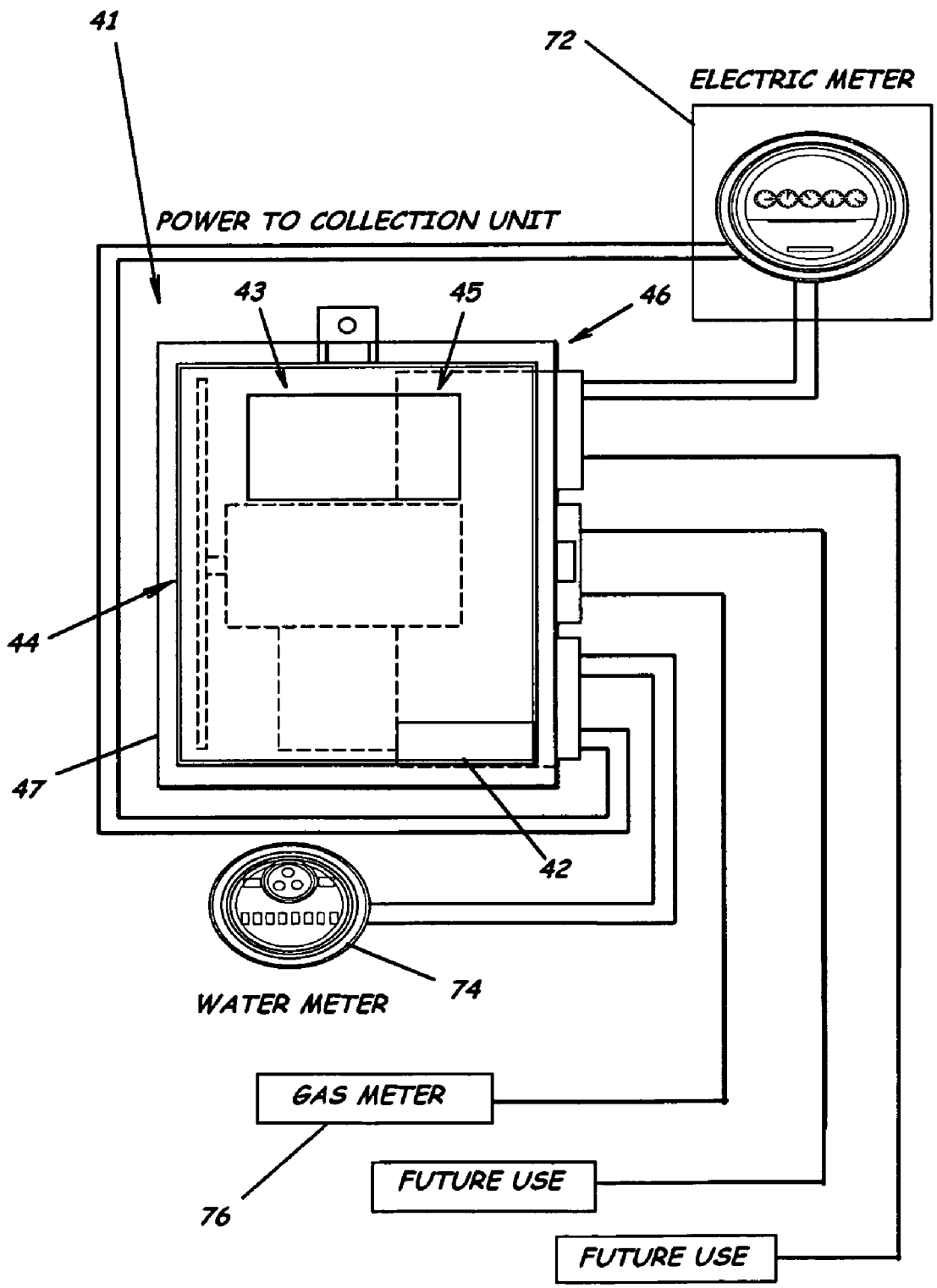
FIG. 9 is schematic view of a meter data collector defining a remote data collection unit and having a plurality of data collection ports each for a plurality of different utility meters or other uses according to an embodiment of the present invention.
Figure 10:
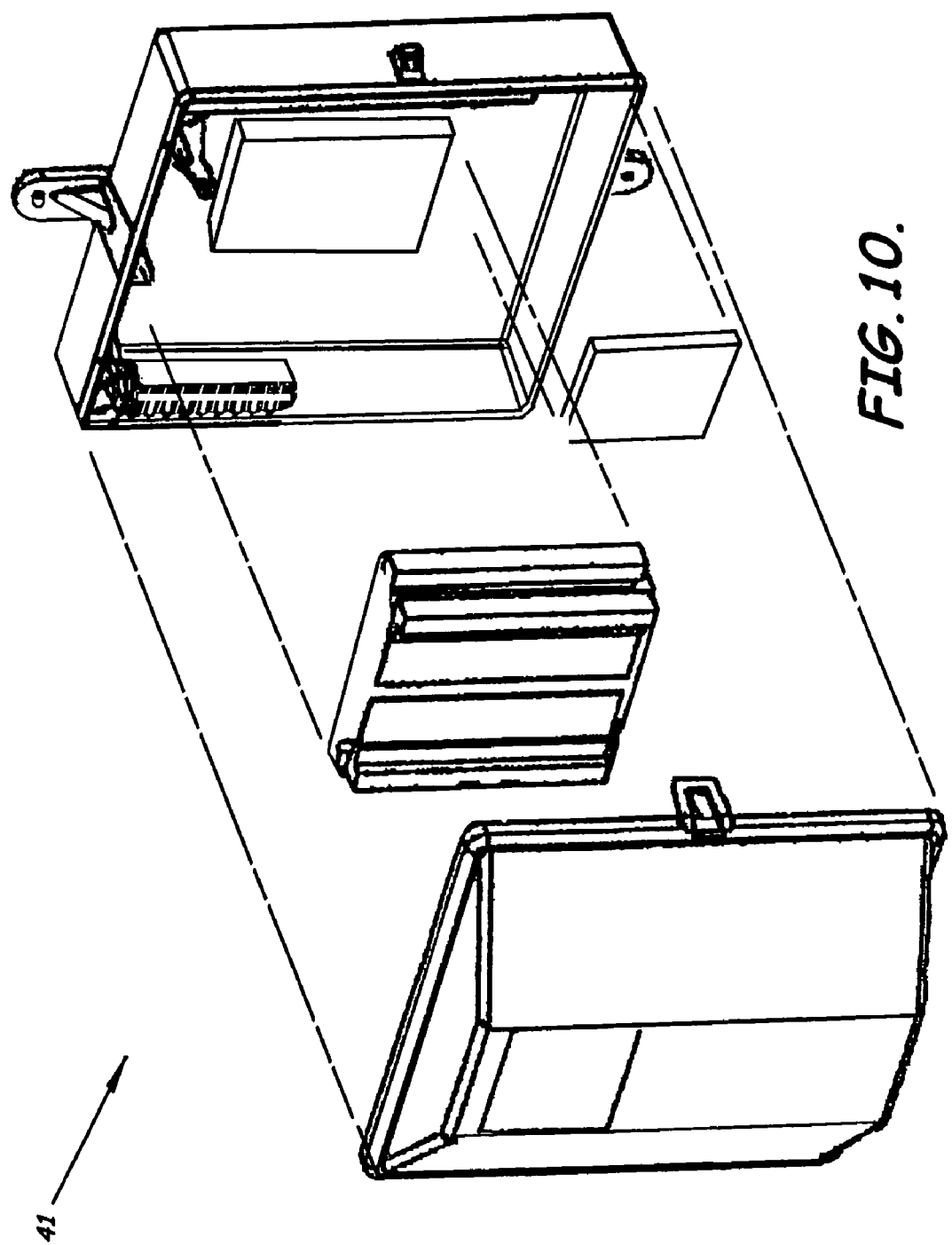
FIG. 10 is an exploded perspective view of a meter data collector defining a remote data collection unit associated with a first embodiment of a housing according to an embodiment of the present invention.
Figure 11:
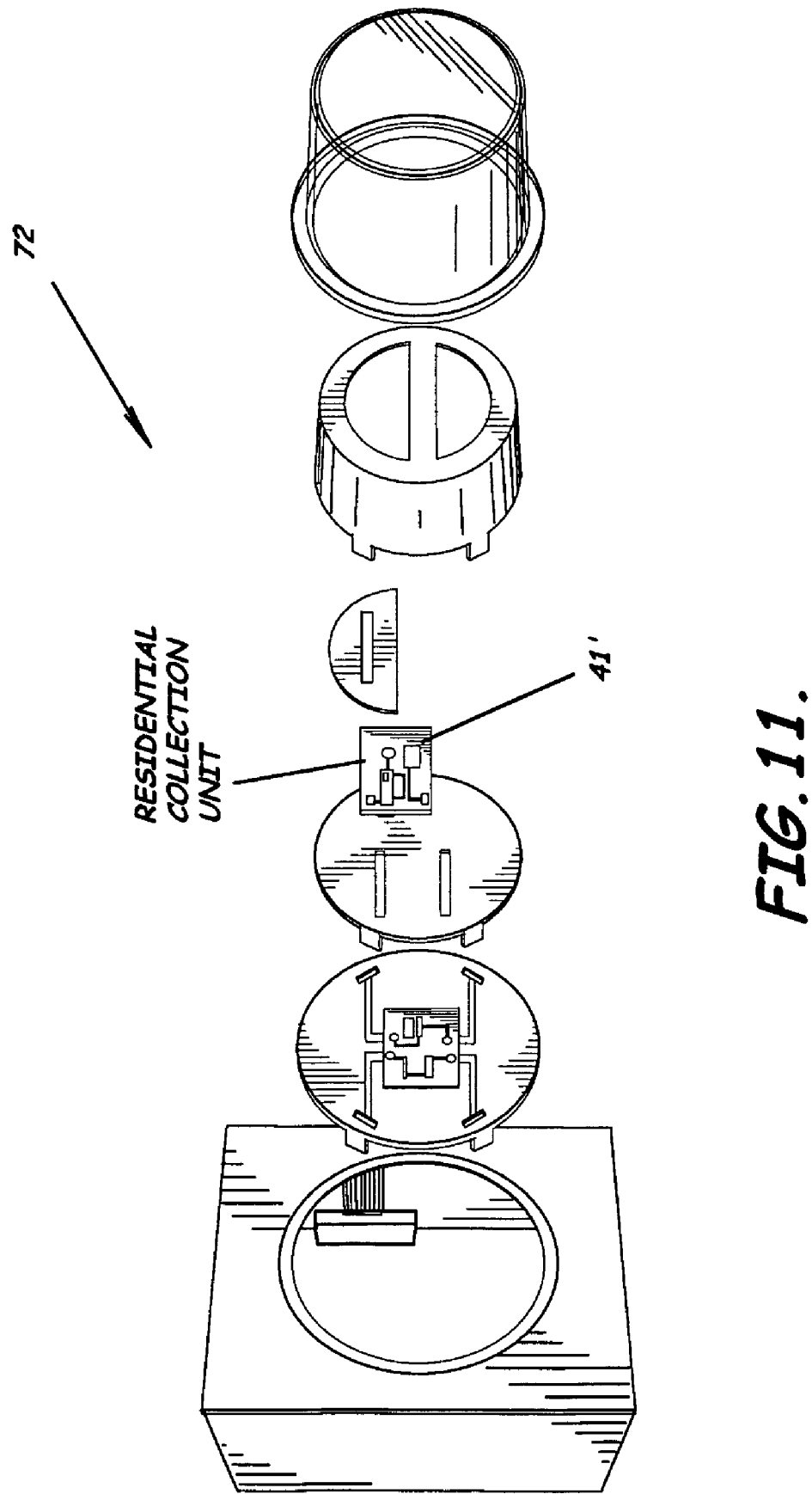
FIG. 11 is an exploded perspective view of a meter data collector defining a remote data collection unit associated with a second embodiment of a housing according to another embodiment of the present invention.
Figure 12:
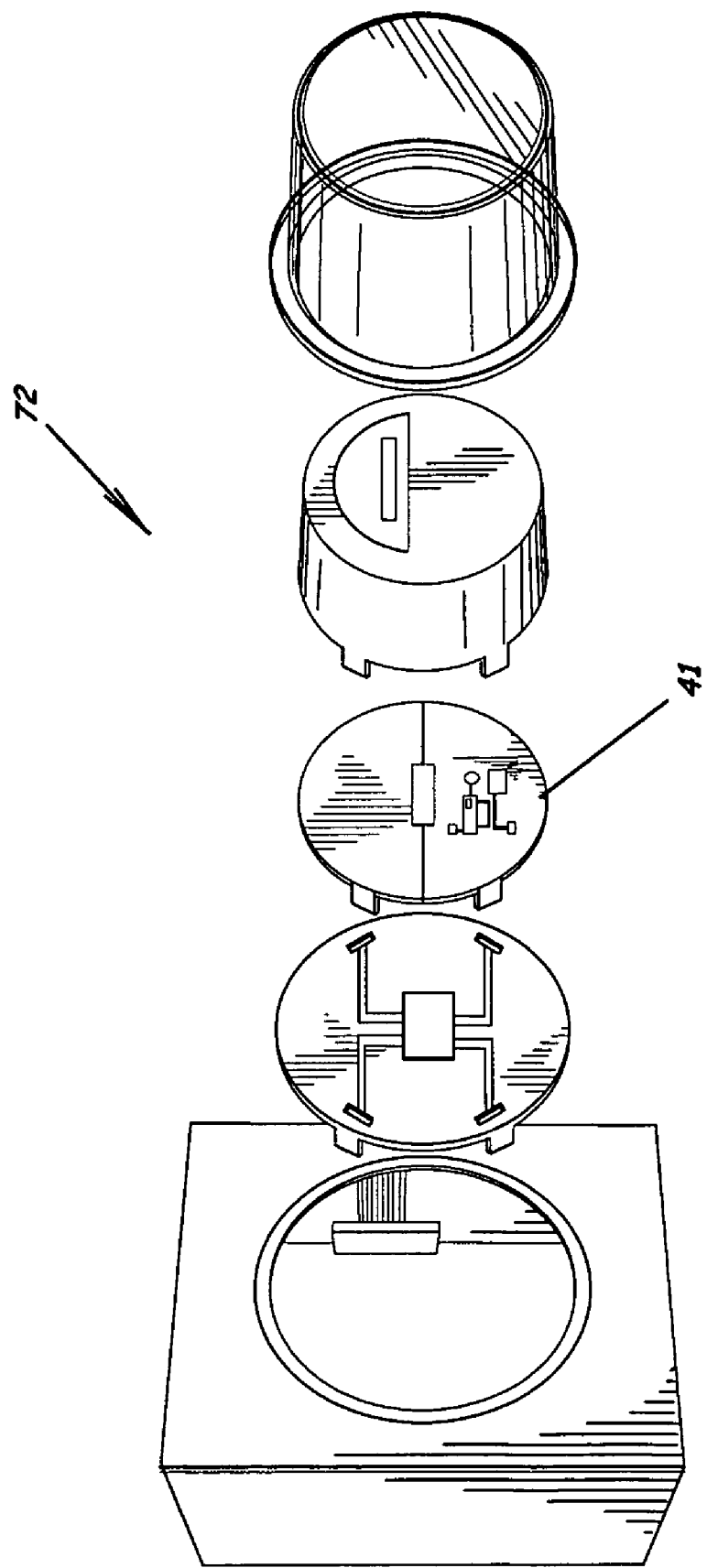
FIG. 12 is an exploded perspective view of a meter data collector defining a remote data collection unit associated with a third embodiment of a housing according to yet another embodiment of the present invention.

At least one of the plurality of meter data collectors 41 is positioned within at least one of the following: the same housing as at least one of the plurality of utility meters (see e.g., FIG. 12), a separate housing positioned closely adjacent at least one of the plurality of utility meters, and a separate housing positioned closely adjacent a subset of the plurality of utility meters (see e.g., FIG. 9). The host computer 61 further includes memory (not shown) having a meter data collector database (not shown) associated therewith to thereby store meter collector data associated with each of the plurality of meter data collectors 41, the meter collector data including collector identification, collector physical address, and strength of signal between collectors 41.

Also, an automated meter reading network system 30 is provided according to an embodiment of the present invention. The system 30 includes a plurality of sensors (not shown) adapted to be interfaced with each of a plurality of utility meters each positioned remote from another one of the plurality of utility meters e.g., electric 72, water 74, gas 76, or other usage, so that at least one of the plurality of sensors interfaces with and is positioned adjacent at least one of the plurality of meters to thereby sense utility usage data from each of the plurality of meters, and a plurality of meter data collectors positioned to collect utility usage data from each of the plurality of sensors so that at least one of the plurality of meter data collectors is positioned in communication with at least one of the plurality of sensors. The plurality of meter data collectors 41 also is adapted to be positioned in communication with each other through the communication network 32 so that each of the plurality of meter data collectors 41 defines one of a plurality of communication nodes 41 in a communication network 32, and a host computer 61 is positioned remote from the plurality of meter data collectors 41 and in communication with each of the plurality of communication nodes 41 so that each one of the plurality of communication nodes 41 are adapted to communicate with other ones of the plurality of communication nodes 41.

The system 30 can also have each of the plurality of meter data collectors 41 including a collector transceiver 44 positioned to transmit data to the host computer 61 and to other ones of the plurality of meter data collectors 41 and to receive data from the computer 61 and from the other ones of the plurality of meter data collectors 41 and a collector controller 43 positioned to control collecting of utility usage data and the transmitting and receiving of data to and from the collector transceiver 44. The host computer 61 includes a host transceiver (not shown) positioned to transmit data to and receive data from each of the plurality of communication nodes 41 and a host controller (not shown) positioned to control collecting of utility usage data from each of the plurality of communication nodes 41, transmitting data to each of the plurality of communication nodes 41 through the host transceiver, and receiving data from each of the plurality of communication nodes 41 through the host transceiver. Each collector controller 43 of the plurality of meter data collectors 41 and the host controller include controller software (not shown) associated with the respective controller and having a network data communication protocol. The network data communication protocol includes a preselected application layer, and the communication network 32 includes a radio frequency communication network.

The radio frequency communication network has a frequency in the range of 850-1000 mega-hertz, wherein the frequency continuously changes between a plurality of different preselected frequencies to thereby define frequency hopping. The controller software of the host controller initiates polling of the plurality of communication nodes 41 through the frequency hopping within the communications network 32. Each of the plurality of communication nodes 41 responds to the polling by the host computer 61 through the frequency hopping within the communications network 32.

The network software includes an autosequencer (not shown) to initiate polling of the plurality of communication nodes 41 whereby each of the plurality of communication nodes 41 is individually attempted to be polled by the host computer 61 to determine a strength of communication signal between the host computer 61 and each of the plurality of communication nodes 41. Each of the plurality of communication nodes 41 also attempt to communicate with each other responsive to the autosequencer to determine a strength of communication signal between one of the plurality of communications nodes 41 and another one of the plurality of communication nodes 41. The autosequencer further determines a communication sequence to each of the plurality of communication nodes 41 responsive to the strength of communication signal between the host computer 61 and each of the plurality of communication nodes 41 and responsive to the strength of communication signal between each of the plurality of communication nodes 41 to define a preferred communication sequence path to each of the plurality of communication nodes 41 from the host computer 61. The autosequencer updates the preferred communication sequence path to allow the preferred communication sequence path to vary over time.

The plurality of meter data collectors 41 can include a first meter data collector 41, a second meter data collector 41 in communication with the first meter data collector 41, and a third meter data collector 41 in communication with at least one of the first and second meter data collectors 41. The first meter data collector 41 is positioned remote from the host computer 61, to thereby have a greater signal strength than the second meter data collector 41 and the third meter data collector 41. The second meter data collector 41 is positioned remote from host computer 61, to thereby have a greater signal strength than the third meter data collector 41. The network software (not shown) further includes a raking router (not shown) to collect meter usage data from the first meter data collector 41 responsive to polling received from the host computer 61, and to rakingly collect data from each of the second and third meter data collectors 41 responsive to the polling so that meter usage data is collected from each of the first, second, and third meter data collectors 41 responsive to polling the first meter data collector 41 and routed to the host computer 61. At least one of the plurality of meter data collectors 41 is positioned within at least one of the following: the same housing as at least one of the plurality of utility meters, a separate housing positioned closely adjacent at least one of the plurality of utility meters, and a separate housing positioned closely adjacent a subset of the plurality of utility meters. The host computer 61 further includes a memory (not shown) having a meter data collector database (not shown) associated therewith to thereby store meter collector data associated with each of the plurality of meter data collectors 41, the meter collector data including collector identification, collector physical address, and strength of signal between meter data collectors 41.

An embodiment of the present invention also provides a meter data collector 41 to interface with a utility meter, e.g., electric 72, water 74, gas 76, or other usage. The meter data collector 41 includes a stationary housing 47 adapted to be mounted adjacent a utility meter, a sensor (not shown) positioned to sense meter usage data from the utility meter, a high power transceiver 44 associated with the housing 47 to transmit meter usage data from the meter data collector 41 and to receive communication remote from the stationary housing 47 in a medium to high range, a collector controller 43 positioned within the housing 47 to control data communication to and from the high power transceiver 44 and to control collecting of meter usage data from the sensor responsive to a remote command, and a memory 45 positioned within the stationary housing 47 and associated with and in communication with the controller 43 to store data therein, the memory 45 including network software (not shown) to communicate the meter usage data remotely through a communication network 32. The network software can include a preselected network data communication protocol, which includes a preselected application layer, and the communication network 32 can be a radio frequency communication network. The radio frequency communication network can have a frequency in the range acceptable to the FCC such as 850-1000 mega-hertz or 2.4 to 5.8 giga-hertz and which allows the frequency to continuously change between a plurality of different preselected frequencies to thereby define frequency hopping. A remote host computer controller (not shown) can initiate polling of the meter data collector through the frequency hopping within the communications network, and the collector controller 43 responds to the polling by the host computer controller through the frequency hopping within the communications network 32.

The network software includes an autosequencer (not shown) to initiate polling by the host computer controller and to initiate polling of at least one of a plurality of communication nodes 41 whereby each of the plurality of communication nodes 41 is individually attempted to be polled by the host computer 61 to determine a strength of communication signal between the host computer 61 and each of the plurality of communication nodes 41. Each of the plurality of communication nodes 41 also attempt to communicate with each other, responsive to the autosequencer, to determine a strength of communication signal between one of the plurality of communications nodes 41 and another one of the plurality of communication nodes 41 to thereby assist in determining a preferred communication sequence path to each of the plurality of communication nodes 41 from the host computer 61. The autosequencer updates the preferred communication sequence path to allow the preferred communication sequence path to vary over time.

As shown in FIGS. 1-15E, as described above, the present invention also includes various embodiments of related methods. An embodiment of a method of collecting utility meter usage data includes sensing meter usage data from each of a plurality of utility meters, e.g., electric 72, water 74, gas 76, or other usage, positioned remote from each other, collecting utility usage data by each of a plurality of meter data collectors 41 positioned adjacent each of the plurality of utility meters, determining a preferred polling sequence route responsive to the strength of communication signal, polling each of the plurality of meter data collectors 41 by a host computer 61 positioned remote from the plurality of meter data collectors 41 to thereby determine a strength of communication signal between the remote host computer 61 and the plurality of meter data collectors 41 positioned adjacent the plurality of utility meters, and transmitting meter usage data to the host computer 61 from each of the plurality of meter data collectors 41 along the preferred polling sequence route responsive to the polling by the host computer 61. The steps of polling and determining, for example, are periodically performed to update the preferred polling sequence route over time. The plurality of meter data collectors 41 can include a first meter data collector 41, a second meter data collector 41 in communication with the first meter data collector 41, and a third meter data collector 41 in communication with at least one of the first and second meter data collectors 41, and the first meter data collector 41 is positioned remote from the host computer 61, to thereby have a greater signal strength than the second meter data collector 41 and the third meter data collector 41, the second meter data collector 41 is positioned remote from host computer 61, to thereby have a greater signal strength than the third meter data collector 41. The method can further include rakingly collecting data from each of the second and third meter data collectors 41 responsive to the polling of the first meter data collector 41 so that meter usage data is collected from each of the first, second, and third meter data collectors 41 responsive to polling the first meter data collector 41 and routing the rakingly collected meter usage data to the host computer 61.

At least one of the plurality of meter data collectors 41 is positioned within at least one of the following: the same housing as at least one of the plurality of utility meters, a separate housing positioned closely adjacent at least one of the plurality of utility meters, and a separate housing positioned closely adjacent a subset of the plurality of utility meters. The host computer 61, can include a memory (not shown) having a meter data collector database (not shown) associated therewith to thereby store meter collector data associated with each of the plurality of meter data collectors 41, the meter collector data including collector identification, collector physical address, and strength of signal between meter data collectors 41.

An embodiment of the present invention also provides a method of monitoring a utility meter, e.g., electric 72, water 74, gas 76, or other usage, mounted to a building. The method includes mounting a meter data collector 41 defining a remote collection unit 41 adjacent a utility meter mounted to a building, collecting meter data from the utility meter by the remote collection unit 41, transmitting the meter data to a router of a communication network service provider (not shown), transmitting the meter data through a communication network 80 associated with the communication network service provider, and receiving the meter data from the communication network 80 by a computer device. The remote collection unit 41 can be a first remote collection unit 41, the utility meter can be a first utility meter, and the building can be a first building, and the method further can include mounting a second remote collection unit 41 adjacent a second utility meter mounted to second building, collecting meter data from the second utility meter by the second remote collection unit 41 and transmitting the meter data from the second utility meter by the second remote collection unit 41, and transmitting the meter data of the second utility meter to the first remote collection unit 41. The meter data transmitted to the router, for example, can include meter data from the first and second remote collection units 41.

Yet another embodiment of a method of collecting utility meter data from a plurality of utility meters, e.g., electric 72, water 74, gas 76, or other usage, each mounted to a different building and each in communication with a respective one of a plurality of meter data collectors 41 defining a plurality of remote collection units 41, is also provided. The method can include transmitting utility meter data from a first remote collection unit 41 of the plurality of utility of remote collection units 41 to a second remote collection unit 41 of the plurality of collection units 41, and transmitting utility meter data of the first remote collection unit 41 and utility meter data of the second remote collection unit 41 from the second remote collection unit 41 to a host computer 61. The method can also include transmitting meter data from a third remote collection unit 41 to the first remote collection unit 41 and wherein the utility meter data of the first remote collection unit 41 includes utility meter data from the third remote collection unit 41.

Another embodiment of a method of collecting utility meter data includes positioning a meter data collector 41 defining a remote collection unit 41 having bi-directional RF data communication within a housing having a glass facing on at lest one side thereof (see FIG. 12), collecting utility meter data by the remote collection unit 41 positioned adjacent the housing, polling the remote collection unit 41 from a host computer 61 by RF data communication through the glass facing, and transmitting the collected utility meter data from the remote collection unit 41 through the glass facing to the host computer 61, responsive to the polling. The utility meter can include a first utility meter of a plurality of utility meters, and the first utility meter can be one or more of a gas utility meter 76, an electric utility meter 72, and a water meter 74. A second of the plurality of utility meters can be a different one of a gas utility meter 76, an electric utility meter 72, and a water utility meter 74. The step of collecting includes collecting utility meter data from both the first and second utility meters by the remote collection unit 41.

As shown in FIGS. 1-8, still another embodiment of a method of collecting utility meter data includes positioning a plurality of meter data collectors 41 defining a plurality of remote collection units 41 adjacent to respective one of a plurality of utility meters. Each of the plurality of utility meters is mounted to a different building. The method also includes polling each of the plurality of remote collection units 41 from a collection computer positioned remote from the plurality of remote collection units 41 and transmitting meter data from each of the plurality of remote collection units 41 to the collection computer responsive to the polling. The method can also include the collection computer being a field collection unit 51, such as, for example, another remote collection unit 41; or the collection computer being a host computer. The method can further include a host computer 61 positioned remote from and in communication with the field collection unit 51. The method additionally can include transmitting the utility meter data from the field collection unit 51 to a router of a communication network service provider, communicating the utility meter data through a communication network 80 associated with the communication network service provider, and receiving the utility meter data by a host computer 61 in communication with the communication network 80. The method still further can include a first remote collection unit 41 of the plurality of remote collection units 41 transmitting utility meter data to a second remote collection unit 41 of the plurality of remote collection units 41, the second remote collection unit 41 transmitting the utility meter data of the first and second remote collection units 41 to a third remote collection unit 41 of plurality of remote collection units 41, and the third remote collection unit 41 transmitting utility meter data of the first, second, and third remote collection unit 41 to the field collection unit 51.

For how each meter data collector 41 defining a remote collection unit operates, the device hardware, e.g., silicon integrated circuit such as Dallas Semiconductor DS2401/ DS2411, provides a 6-byte unique identification number. The least significant 4 bytes of the unique identification number are utilized to determine a selected routing source identification number. The least significant 1 byte of the selected routing source identification number determines the device default frequency index within the attached array of transmit and receive settings for a transceiver such as a Chipcon 1020 bi-directional transceiver as understood by those skilled in the art. For example, as shown in FIG. 15A, if the least significant byte of the selected routing source identification number were 0x00, then the corresponding default receive frequency would be 909300000 hertz (Hz). If the least significant byte of the selected routing source identification number were 0x001, then the corresponding default receive frequency would be 924200000 Hz. In this way, for example, 256 frequencies are utilized and organized in a pseudorandom non-repeating manner, as illustrated in FIGS. 15A-15E.

As understood by those skilled in the art, the host computer 61, for example, can have server software (not shown) to initiate communication messages to each of the plurality of destination remote collection units 41. A destination remote collection unit 41, for example, can be: (1) directly connected to the host computer 61; (2) connected via radio frequency from the remote collection unit 41 directly connected to the host computer 61, or (3) connected via radio frequency for up to a preselected number, e.g., 15, radio frequency repeater remote collection units 41 to the remote collection unit 41 directly connected to the host computer 61. The communications portion of a message protocol packet can include the routing source identification number, routing source radio frequency index, routing destination identification number, routing destination radio frequency index, routing gateway node count, and up to the preselected number, e.g., 15, routing gateway identification numbers and their corresponding radio frequency indices. The communications portion of the acknowledgement packet can include the routing identification number, routing source radio frequency index, routing destination identification number, and routing destination radio frequency index. The routing source identification number identifies the remote collection unit 41 transmitting the message. The host server software, for example, can keep an internal database of the remote collection unit identification numbers and their active radio frequency indices based upon each successful communication. On startup, the host server software assigns the remote collection unit radio frequency index to the least significant byte of the unit unique address. The host server software, as understood by those skilled in the art, also can ensure non-consecutive identical frequency indices in any given communications path.

The message validation for the remote collection unit 41 can use a remote collection unit identification number to equal either the routing destination identification number or the first routing gateway identification number. The unit acknowledgment message validation can use the unit identification number to equal the routing destination identification number. Additional communication packet validation criteria include message sequence number, message type, and CRC calculations. Upon receipt of a valid message, the receiving remote collection unit 41 will increment/alter its radio frequency index and transmit an acknowledge packet to the received packet routing source identification number at the current radio frequency index. If the remote collection unit 41 was the intended destination, then after transmitting the acknowledgment packet the remote collection unit 41 will transmit the response at the incremented/altered radio frequency index. If the remote collection unit 41 was an intended receiver, but not the message destination (see, e.g., FIG. 5), after transmitting the acknowledgment packet, the remote collection unit 41 will forward the message utilizing the received packet first routing gateway frequency index. For example, the units 41 configured as receivers can shift frequencies in synchronization with the units 41 configured as transmitters as described above. The units 41, also for example, can use the same Chipcon 1020 bi-directional transceivers, or other transceivers as understood by those skilled in the art, and can be configured such that the remote collection unit receiver input bandwidth matches the hopping channel bandwidth of their corresponding remote collection unit transmitter.

As shown in FIGS. 1-8, this fixed automated meter reading network system 30 supports bi-directional communications with the capability of collection of digital and analog input data, as well as functional control, via digital output relays. The remote collection unit platform 41 monitors data, for example, from four digital inputs and two encoded inputs and transmits that data to a utility's central office via a 902-928 mega-hertz frequency hopping mesh network 32 as understood by those skilled in the art. The remote collection unit 41, for example, utilizes a medium to high range RF radio capable of communications of 1600 meters or approximately one mile and a field host unit 51 that connects the network 32 to a wireless, cable, fiber, or telephony wide area network 80. Field host units 51 (also which can be another remote collection unit 41) can reside at the municipality infrastructure level such as a sub-station, pump station, or municipal office 50. These intelligent units 51 have an embodiment of the software (not shown) of the present invention loaded and responsible for collecting interval data from the surrounding field 51 or remote 41 collection units then transmitting that data when requested by the primary host 61, located at the central office 60, in a batch format. Additional remote units 34, 35, (see FIGS. 7 and 8) can be used to bridge one set of remote field units 41 to another set of field units 41 otherwise not within communications range.

After the units 34, 35, 41, 51, are installed in the field and the primary host system 61 is in place, the software gathers a list of available field units 41, 51. This process is dynamic in nature and at its conclusion would have a complete network communications map through a communication network 80 ready to begin the job of data collection. As a mesh network 32, each unit 41 has multiple communication paths between it and the local field host unit 51, e.g., supporting up to 15 links or levels in a single path. The primary host system 61 located at the central office 60, for example, polls field units on a revolving schedule 24 hours a day, 7 days a week, 365/366 days a year. Metering data received at the host site 60 is then converted into OLE DB compatible database file formats, as understood by those skilled in the art, for input into existing customer information and billing systems. This system 30 and each remote collection unit 41, for example, allows for additional expansion of input/output as needed, including remote disconnect, appliance control for load curtailment, or outage detection to consumer value functions such as security, detection, or alarm notification. The system 30 can have a primary host 61 located at a central office 60 with connection capabilities to customer billing, and field host units 51 located through the city and connected to the fiber optic infrastructure to establish wireless communication to all available remote collection units 41. The field host units 51 establish the communication, request and store data, and pass the instructions from the primary host 61 to the remote collection units 41. The remote collection units 41, located at a customer location, such as mounted to residence or other building structure 40, can each be connected to all devices at the customer's location that are required to meet the appropriate phase requirements, such as metering aspects in phase one, community service aspects in phase two, and so forth as understood by those skilled in the art. The remote collection units 41 can collect metering data from the various meters, e.g., electric 72, water 74, gas 76, or other usage. The field host unit 51 periodically polls the remote collection unit 41 located at the customer location, e.g., approximately every 15 minutes, and receives a packet of information that includes I.D., consumption, date and time stamp, network stats, and other data, as desired. The field host unit 51 can maintain a consumption file (not shown) of all collected data received from each remote collection unit 41 in its range. The primary host 61 establishes a connection with each field host unit 51 and downloads the consumption file, process the file, and makes ready for billing as understood by those skilled in the art. The RF radio of each remote collection unit 41, field host unit 51, and/or host computer 61 preferably is a medium to high range radio as understood by those skilled in the art, e.g., preferably in a range of 1 Watt or greater. The RF radio of the field host unit 51 can establish communications 38 to far reaching remote collection units 41 and rake data back (e.g., see FIG. 4) or, directly through units 41, can establish communication links 36, 37, (e.g., see FIG. 5) and also rake data back, as desired.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

That claimed is:

1. An automated meter reading network system comprising:
    a plurality of utility meters each one positioned remote from the other ones of the plurality of utility meters;
    a plurality of sensors interfaced with each of the plurality of meters so that at least one of the plurality of sensors interfaces with and is positioned adjacent at least one of the plurality of meters to thereby sense utility usage data from each of the plurality of meters;
    a communication network;
    a plurality of meter data collectors positioned to collect utility usage data from each of the plurality of sensors so that at least one of the plurality of meter data collectors is positioned adjacent at least one of the plurality of utility meters and in communication with at least one of the plurality of sensors which interfaces with the at least one of the plurality of utility meters, the plurality of meter data collectors also being adapted to be positioned in communication with each other through the communication network so that each of the plurality of meter data collectors defines a communication node in the communication network and the plurality of meter data collectors defines a plurality of communication nodes in the network; and
    a host computer positioned remote from the plurality of meter data collectors at a utility central station and in communication with each of the plurality of meter data collectors in the communication network so that each one of the plurality of meter data collectors are adapted to communicate with other ones of the plurality of meter data collectors in the communication network, the host computer including network software including instructions that when executed by the host computer cause the host computer to perform the operations of determining a preferred polling sequence route responsive at least in part to a strength of communication signal between the host computer and each of the plurality of meter data collectors and between each of the plurality of meter data collectors along the determined polling sequence route to thereby reduce line-of-site communication problems between each of the plurality of meter data collectors and the host computer, and sending a message packet including routing data to route the message packet along the preferred polling sequence route between the host computer and a selected meter data collector defining a destination node and along the preferred polling sequence route between the destination node and the host computer, the message packet collecting strength of communication signal data between each node along the preferred polling sequence route to the destination node and along the preferred polling sequence route to the host computer;
    the network software including an autosequencer positioned to initiate systematic polling of the plurality of meter data collectors whereby each of the plurality of meter data collectors is individually attempted to be polled by the host computer to determine a strength of communication signal between the host computer and each of the plurality of meter data collectors, and whereby each of the plurality of meter data collectors also attempt to communicate with each other responsive to the autosequencer to determine a strength of communication signal between one of the plurality of meter data collectors and another one of the plurality of meter data collectors, the autosequencer further positioned to determine a communication sequence to each of the plurality of meter data collectors responsive to the strength of communication signal between the host computer and each of the plurality of meter data collectors and responsive to the strength of communication signal between each of the plurality of meter data collectors to define the preferred polling sequence route to each of the plurality of meter data collectors from the host computer, and to update the preferred polling sequence route responsive to strength of communication signal data gathered by each message packet after each subsequent polling sequence to allow the preferred polling sequence route to vary over time.

2. A system as defined in claim 1, wherein the message packet includes a payload data section for retrieving utility usage data from at least one of the plurality of meter data collectors, and wherein each of the plurality of meter data collectors includes a collector transceiver positioned to transmit data to the host computer and to other ones of the plurality of meter data collectors through the communication network and to receive data from the host computer and from the other ones of the plurality of meter data collectors through the communication network and a collector controller positioned to control collecting of utility usage data from at least one of the plurality of sensors, to transfer data to and to receive data from the collector transceiver, and to add the utility usage data to the payload data section responsive to the routing data.

3. A system as defined in claim 2, wherein the host computer includes a host radio frequency transceiver positioned to transmit data to and receive data from each of the plurality of meter data collectors and a host controller positioned to control collecting of utility usage data from each of the plurality of meter data collectors, transmitting data to each of the plurality of meter data collectors though the host transceiver, and receiving data from each of the plurality of meter data collectors through the host transceiver.

4. A system as defined in claim 1,
wherein the message packet includes a payload data section for retrieving utility usage data from at least one of the plurality of meter data collectors;
wherein each of the plurality of meter data collectors includes a collector transceiver positioned to transmit data to the host computer and to other ones of the plurality of meter data collectors through the communication network and to receive data from the host computer and from the other ones of the plurality of meter data collectors through the communication network, and a collector controller positioned to control collecting of utility usage data from at least one of the plurality of sensors and loading the utility usage data in the payload data section of the message packet;
wherein the host computer includes a host controller positioned to control collecting of utility usage data from each of the plurality of meter data collectors, routing the message packet through the communication network to the destination node to collect the utility usage data through the communication network from at least one of the nodes along the preferred polling sequence route to the destination node, and retrieving the utility usage data from the routed message packet;
wherein each collector controller of the plurality of meter data collectors and the host controller include network software associated with the controller and having a network data communication protocol;
wherein the network data communication protocol includes a preselected application layer; and
wherein the communication network comprises a radio frequency communication network.

5. A system as defined in claim 4,
wherein the radio frequency communication network has a frequency in the range of 850-1000 mega-hertz, wherein the frequency continuously changes between a different one of a plurality of preselected frequencies between complete data packet transmissions to thereby define frequency hopping;
wherein the network software of the host controller initiates polling of the plurality of meter data collectors through the frequency hopping within the communications network; and
wherein each of the plurality of meter data collectors responds to the polling by the host controller through the frequency hopping within the communications network along the respective preferred polling sequence route.

6. A system as defined in claim 1, wherein the plurality of meter data collectors include a first meter data collector, a second meter data collector in communication with the first meter data collector, and a third meter data collector in communication with at least one of the first and second meter data collectors, wherein the first meter data collector is positioned remote from the host computer to thereby have a greater signal strength than the second meter data collector and the third meter data collector, wherein the second meter data collector is positioned remote from host computer to thereby have a greater signal strength than the third meter data collector, and wherein the network software further includes a raking router to collect utility usage data from the first meter data collector responsive to polling received from the host computer and to rakingly collect data from each of the second and third meter data collectors responsive to the polling so that utility usage data is collected from each of the first, second, and third meter data collectors responsive to polling the first meter data collector and routed to the host computer.

7. A system as defined in claim 6, wherein at least one of the plurality of meter data collector is positioned within the same housing as at least one of the plurality of utility meters, the housing having a glass facing on at least one side thereof, the meter data collector positioned within the housing to transmit through the glass.

8. A system as defined in claim 1, wherein the host computer further includes memory having a meter data collector database associated therewith to thereby store meter collector data associated with each of the plurality of meter data collectors, the meter collector data including collector identification, collector physical address, and strength of signal between collectors.

9. An automated meter reading network system comprising:
a plurality of sensors adapted to be interfaced with each of a plurality of utility meters each positioned remote from another one of the plurality of utility meters so that at least one of the plurality of sensors interfaces with and is positioned adjacent at least one of the plurality of meters to thereby sense utility usage data from each of the plurality of meters;
a plurality of meter data collectors positioned to collect utility usage data from each of the plurality of sensors so that at least one of the plurality of meter data collectors is positioned in communication with at least one of the plurality of sensors, the plurality of meter data collectors also being adapted to be positioned in communication with each other through the communication network so that each of the plurality of meter data collectors defines one of a plurality of meter data collectors in a communication network; and a host computer positioned remote from the plurality of meter data collectors and in communication with each of the plurality of meter data collectors so that each one of the plurality of meter data collectors are adapted to communicate with other ones of the plurality of meter data collectors, positioned to poll each of the plurality of meter data collectors, positioned to determine a respective preferred multi-node communication sequence path between the host computer and a selected meter data collector defining a destination node including at least one other of the polled meter data collectors defining at least one intermediate routing node located between the host computer and the destination node, and positioned to send a message packet including routing data to route the message packet along the preferred communication sequence path between the host computer and the destination node via the at least one intermediate routing node, the message packet configured to rakingly collect respective utility usage data from both the destination node and the at least one intermediate routing node located along the preferred communication sequence path so that utility usage data is collected by the message packet from both the destination node and the at least one intermediate routing node along the preferred communication sequence path for delivery to the host computer.

10. A system as defined in claim 9, wherein the message packet includes a payload data section for retrieving utility usage data from at least one of the plurality of meter data collectors, and wherein each of the plurality of meter data collectors includes a collector transceiver positioned to transmit data to the host computer and to other ones of the plurality of meter data collectors and to receive data from the host computer and from the other ones of the plurality of meter data collectors, and a collector controller positioned to control collecting of utility usage data from at least one of the plurality of sensors, to transfer data to and to receive data from the collector transceiver, and to add the utility usage data to the payload data section of the message packet responsive to the routing data.

11. A system as defined in claim 10, wherein the host computer includes a host transceiver positioned to transmit data to and receive data from each of the plurality of meter data collectors and a host controller positioned to control collecting of utility usage data from each of the plurality of meter data collectors, transmitting data to each of the plurality of meter data collectors through the host transceiver, and receiving data from each of the plurality of meter data collectors through the host transceiver.

12. A system as defined in claim 9,
wherein the message packet includes a payload data section for retrieving utility usage data from at least one of the plurality of meter data collectors;
wherein each of the plurality of meter data collectors includes a collector transceiver positioned to transmit data to the host computer and to other ones of the plurality of meter data collectors through the communication network and to receive data from the host computer and from the other ones of the plurality of meter data collectors through the communication network, and a collector controller positioned to control collecting of utility usage data from at least one of the plurality of sensors and loading the utility usage data in the payload data section of the message packet;
wherein the host computer includes a host controller positioned to control collecting of utility usage data from each of the plurality of meter data collectors, routing the message packet through the communication network to the destination node to collect the utility usage data through the communication network from at least one of the nodes along the preferred polling sequence route to the destination node, and retrieving the utility usage data from the routed message packet;
wherein each collector controller of the plurality of meter data collectors and the host controller include network software associated with the controller and having a network data communication protocol;
wherein the network data communication protocol includes a preselected application layer; and
wherein the communication network comprises a radio frequency communication network.

13. A system as defined in claim 12,
wherein the radio frequency communication network has a frequency in the range of 850-1000 mega-hertz, wherein the frequency continuously changes between a different one of a plurality of preselected frequencies between complete data packet transmissions to thereby define frequency hopping;
wherein the controller software of the host controller initiates polling of the plurality of meter data collectors through the frequency hopping within the communications network; and
wherein each of the plurality of meter data collectors responds to the polling by the host computer through the frequency hopping within the communications network.

14. A system as defined in claim 13,
wherein the host computer includes network software;
wherein the network software includes an autosequencer positioned to initiate polling of the plurality of meter data collectors whereby each of the plurality of meter data collectors is individually attempted to be polled by the host computer to determine a strength of communication signal between the host computer and each of the plurality of meter data collectors, and whereby each of the plurality of meter data collectors also attempt to communicate with each other responsive to the autosequencer to determine a strength of communication signal between one of the plurality of meter data collectors and another one of the plurality of meter data collectors, and the autosequencer further positioned to determine a communication sequence to each of the plurality of meter data collectors responsive to the strength of communication signal between the host computer and each of the plurality of meter data collectors and responsive to the strength of communication signal between each of the plurality of meter data collectors to define the preferred communication sequence path to each of the plurality of meter data collectors from the host computer.

15. A system as defined in claim 14, wherein the autosequencer updates each preferred communication sequence path to allow each preferred communication sequence path to each separate one of the plurality of meter data collectors to vary over time.

16. A system as defined in claim 9, wherein the plurality of meter data collectors include a first meter data collector, a second meter data collector in communication with the first meter data collector, and a third meter data collector in communication with at least one of the first and second meter data collectors, wherein the first meter data collector is positioned remote from the host computer to thereby have a greater signal strength than the second meter data collector and the third meter data collector, wherein the second meter data collector is positioned remote from host computer to thereby have a greater signal strength than the third meter data collector, and wherein the network software further includes a raking router to collect the utility usage data from the first meter data collector responsive to polling received from the host computer and to rakingly collect utility usage data from each of the second and third meter data collectors responsive to the polling so that utility usage data is collected from each of the first, second, and third meter data collectors by the same message packet responsive to polling the first meter data collector and is routed to the host computer.

17. A system as defined in claim 9, wherein at least one of the plurality of meter data collector is positioned within the same housing as at least one of the plurality of utility meters, the housing having a glass facing on at least one side thereof, the meter data collector positioned within the housing to transmit through the glass.

18. A system as defined in claim 9, wherein the host computer further includes a memory having a meter data collector database associated therewith to thereby store meter collector data associated with each of the plurality of meter data collectors, the meter collector data including collector identification, collector physical address, and strength of signal between meter data collectors.

19. A meter data collector to interface with a utility meter, the meter data collector including:
   a stationary housing adapted to contain a utility meter;
   a sensor positioned to sense utility usage data from the utility meter;
   a high power transceiver associated with the housing to transmit utility usage data from the meter data collector and to receive communications remote from the stationary housing in a medium to high range;
   a collector controller positioned within the housing to control data communication to and from the high power transceiver and to provide bidirectional radio frequency communication between an adjacent at least one other meter data collector to form a communication network, and to control collecting of local utility usage data from the sensor responsive to a remote command from a requesting remote host computer; and
   a memory positioned within the stationary housing and associated with and in communication with the controller to store data therein, the memory including network software to receive a message packet including a payload carrying utility usage data from the at least one other meter data collector, to combine the local utility usage data with the utility usage data from the at least one other meter data collector, and to communicate the utility usage data remotely through the communication network to the requesting remote host computer along a route determined by the requesting remote host computer.

20. A meter data collector as defined in claim 19, wherein the network software includes a preselected network data communication protocol, wherein the network data communication protocol includes a preselected application layer, and wherein the communication network comprises a radio frequency communication network.

21. A meter data collector as defined in claim 20, wherein the radio frequency communication network has a frequency in the range of 850-1000 mega-hertz, wherein the frequency continuously changes between a different one a plurality of preselected frequencies between complete data packet transmissions to thereby define frequency hopping, wherein a remote host computer controller initiates polling of the meter data collector through the frequency hopping within the communications network, and wherein the collector controller is positioned to respond to the polling by the host computer controller through the frequency hopping within the communications network.

22. A meter data collector as defined in claim 21, wherein the host computer includes network software which includes an autosequencer to initiate polling by the host computer controller and to initiate polling of at least one of a plurality of the meter data collectors whereby each of the plurality of meter data collectors is individually attempted to be polled by the host computer to determine a strength of communication signal between the host computer and each of the plurality of meter data collectors, and whereby each of the plurality of meter data collectors are positioned to also attempt to communicate with each other responsive to the autosequencer to determine a strength of communication signal between one of the plurality of meter data collectors and another one of the plurality of meter data collectors to thereby assist in determining a preferred communication sequence path to each of the plurality of meter data collectors from the host computer.

23. A meter data collector as defined in claim 22, wherein the autosequencer updates the preferred communication sequence path to allow the preferred communication sequence path to vary over time.

\* \* \* \* \*